United States Patent [19]

Kudo et al.

[11] Patent Number: 5,517,243

[45] Date of Patent: May 14, 1996

[54] IMAGE SENSING APPARATUS WITH CONTROL OF CHARGE STORAGE TIME

[75] Inventors: Toshihiko Kudo; Takao Kinoshita; Yuji Sakaegi; Makoto Kondo, all of Kanagawa, Japan

[73] Assignee: Canon Kabushiki Kaisha, Tokyo, Japan

[21] Appl. No.: 206,207

[22] Filed: Mar. 3, 1994

Related U.S. Application Data

[63] Continuation of Ser. No. 81,831, Jun. 23, 1993, abandoned, which is a continuation of Ser. No. 966,598, Oct. 26, 1992, abandoned, which is a continuation of Ser. No. 767,512, Sep. 30, 1991, abandoned.

[30] Foreign Application Priority Data

| Oct. 4, 1990 | [JP] | Japan | 2-264958 |
| Jan. 10, 1991 | [JP] | Japan | 3-001482 |
| Sep. 12, 1991 | [JP] | Japan | 3-233047 |

[51] Int. Cl.$^6$ .................................................. H04N 5/232
[52] U.S. Cl. ........................... 348/296; 348/363; 348/370
[58] Field of Search .................................... 348/220, 221, 348/230, 296, 297, 298, 320, 322, 362, 363, 370, 371

[56] References Cited

U.S. PATENT DOCUMENTS

| 4,541,016 | 9/1985 | Ochi et al. | 358/228 |
| 4,661,854 | 4/1987 | Savoye | 358/213 |
| 4,803,550 | 2/1989 | Yabe et al. | 358/98 |
| 4,831,453 | 5/1989 | Takemura | 358/213.19 |
| 5,031,048 | 7/1991 | Naruto et al. | 358/213.19 |

OTHER PUBLICATIONS

Thorpe et al.—New advances in CCD Imaging—May 1988 pp. 378–387.

Primary Examiner—Wendy R. Greening
Attorney, Agent, or Firm—Robin, Blecker, Daley & Driscoll

[57] ABSTRACT

An image sensing apparatus is provided with a solid-state image sensor which is capable of sweeping out electric charges therefrom, a mechanical shutter and a control circuit for controlling the time period from the time point at which the electric charges of the solid-state image sensor are swept out when the mechanical shutter is in its open state to the time point at which the mechanical shutter is closed.

20 Claims, 19 Drawing Sheets

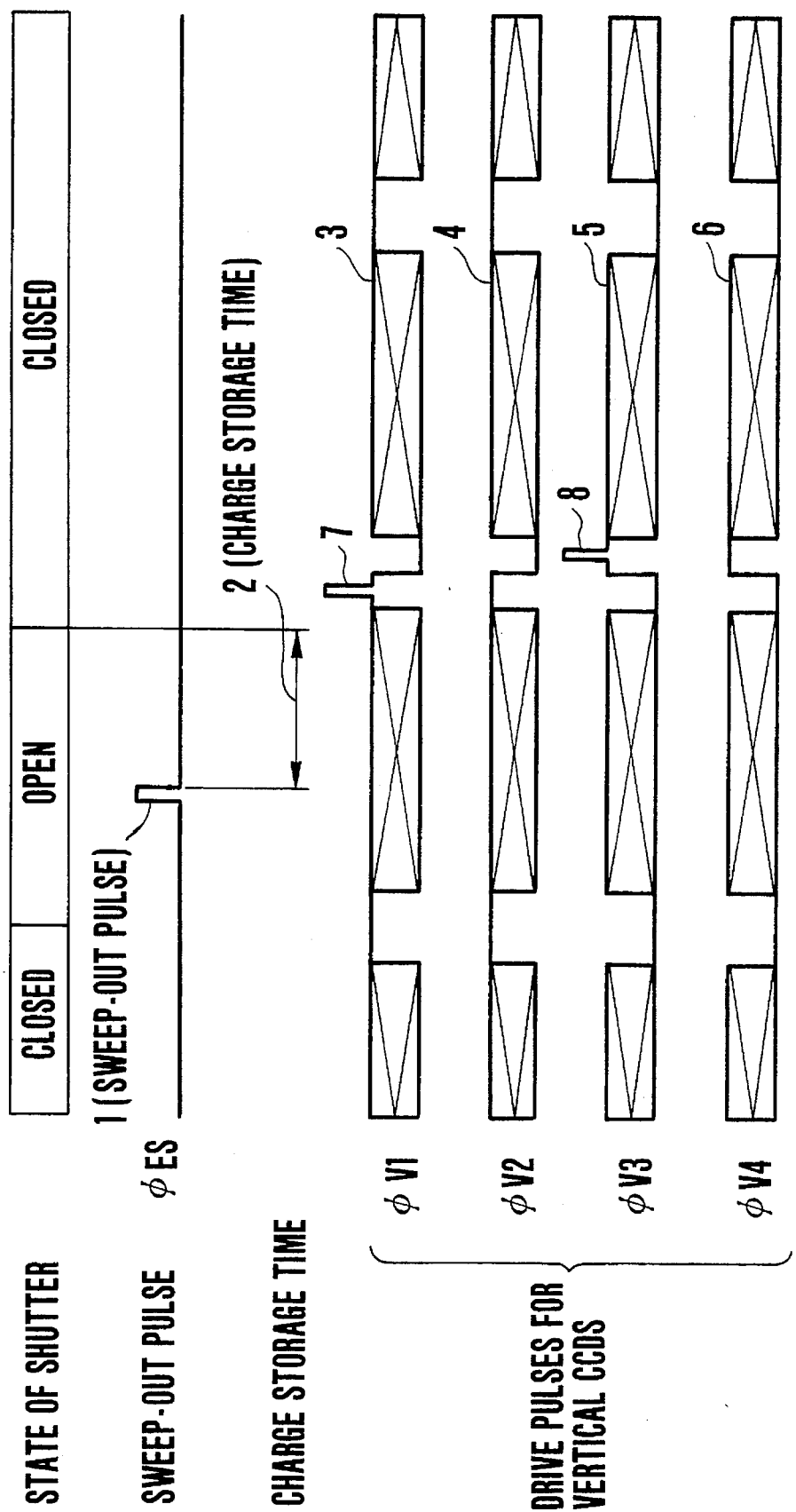

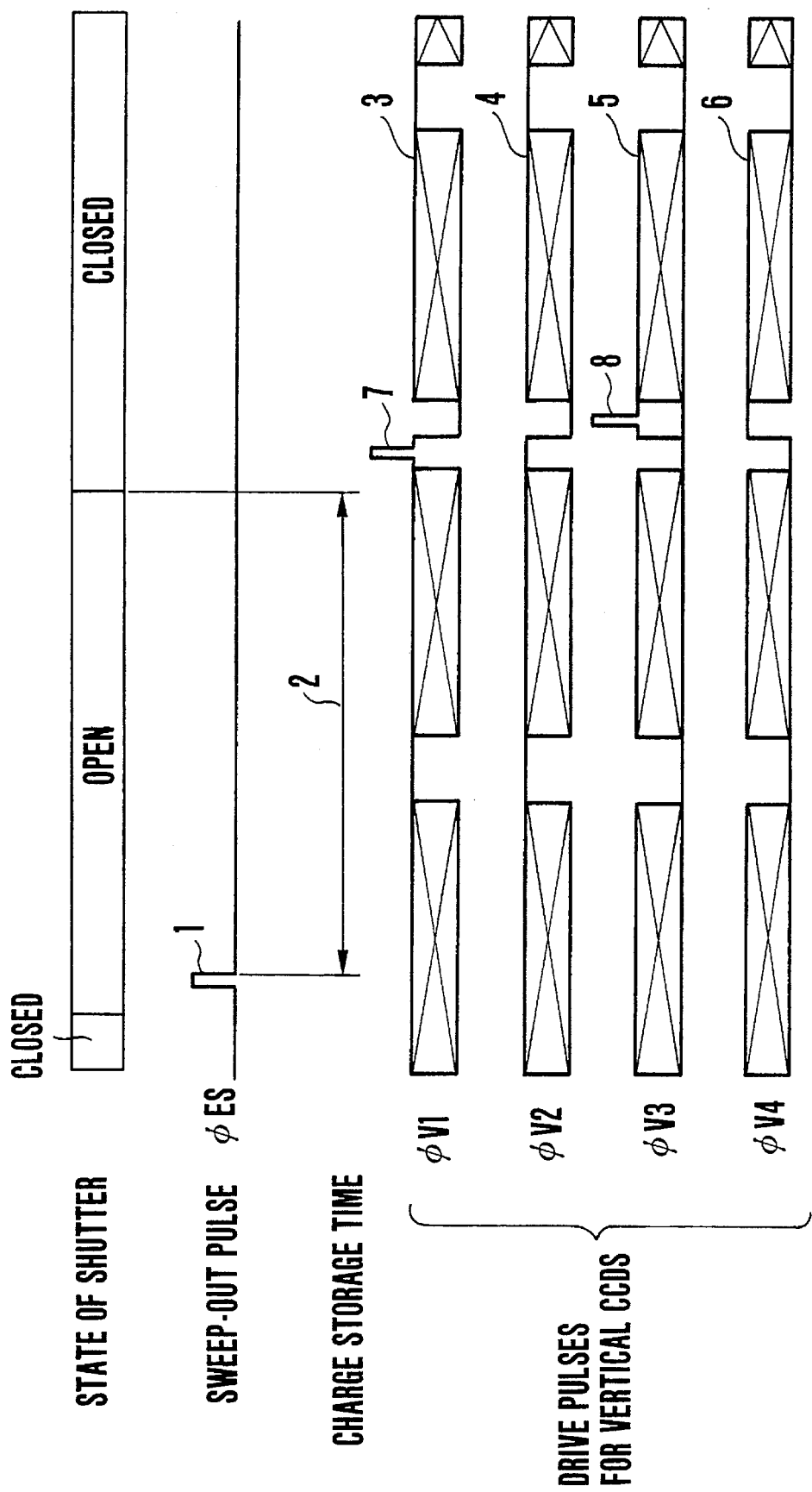

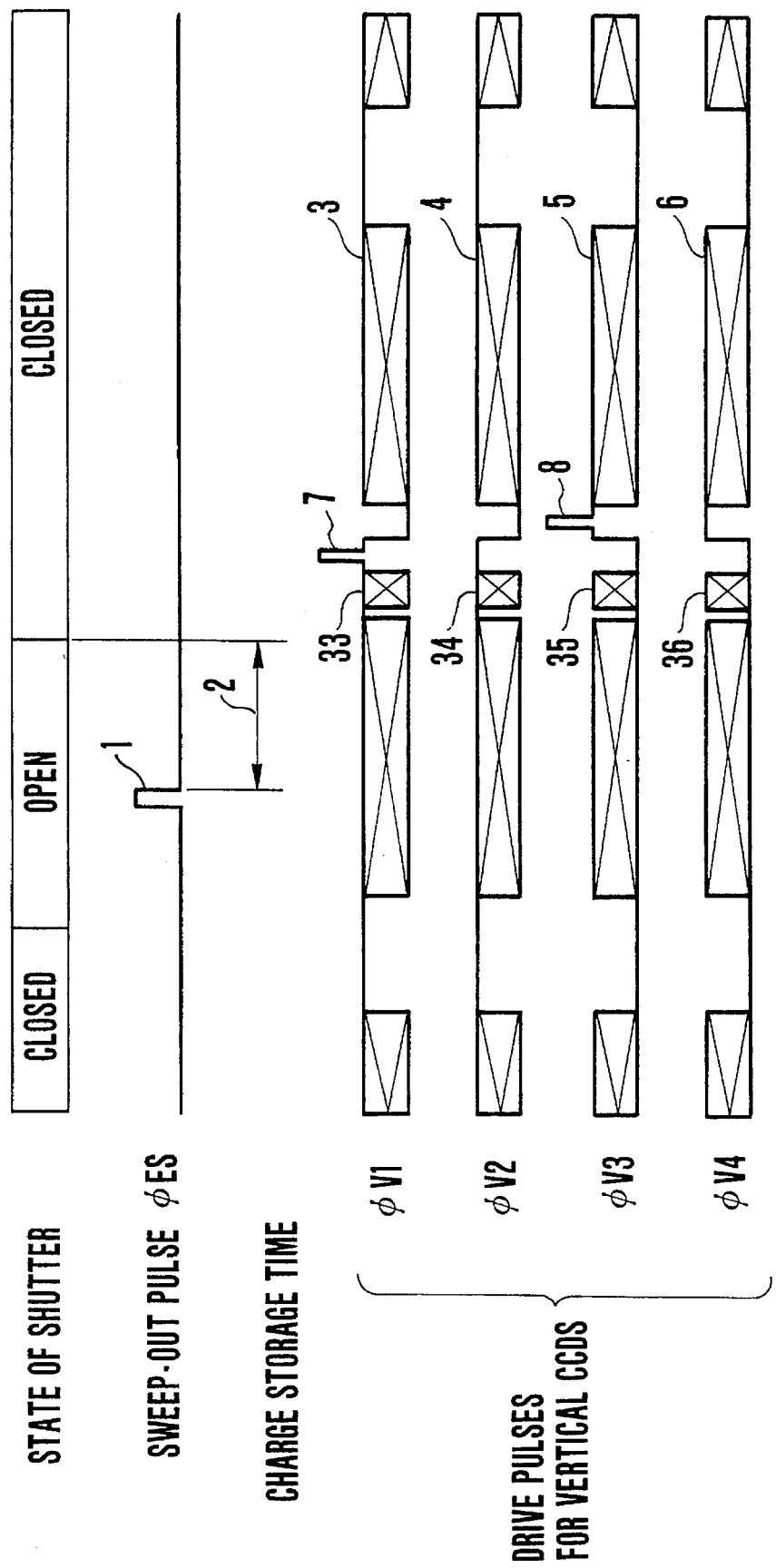

FIELD PHOTOGRAPHY IN EF MODE

FIG. 8 FRAME PHOTOGRAPHY IN EF MODE

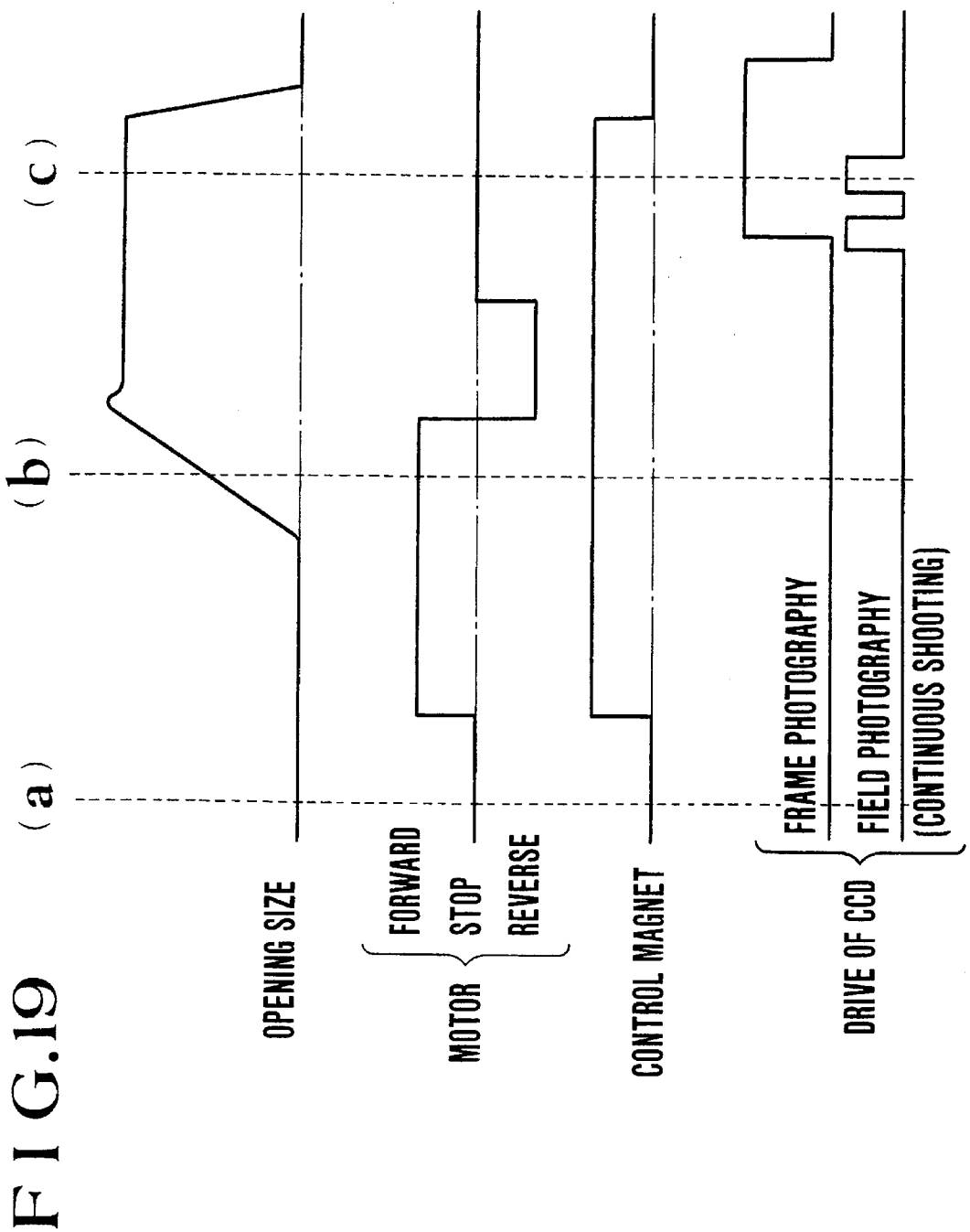

IMAGE SENSING APPARATUS WITH CONTROL OF CHARGE STORAGE TIME

This is a continuation application under 37 CFR 1.62 of prior application Ser. No. 08/081,831, filed Jun. 23, 1993, now abandoned, which is a continuation application under 37 CFR 1.62 of prior application Ser. No. 966,598, filed Oct. 26, 1992, now abandoned, which is a continuation application under 37 CFR 1.62 of prior application Ser. No. 767,512, filed Sep. 30, 1991, now abandoned.

BACKGROUND OF THE INVENTION

1. Field of the Invention

The present invention relates to control of charge storage time in a still video camera (electronic still camera).

2. Description of the Related Art

Still video cameras, which have recently become increasingly popular, typically utilize mechanical shutters as means for controlling the charge storage time of their image sensors. The charge storage time is the time period during which the light required to form an image is incident on a solid-state image sensor, and has conventionally been controlled by opening and closing the mechanical shutter.

Such a conventional arrangement may be regarded as an arrangement in which film for a silver-salt camera is merely replaced with an image sensor, and in such an arrangement, the aperture diameter is controlled by means of the diaphragm disposed in the lens.

However, the shutter blades of the mechanical shutter generally show variations in operation, and a complicated mechanism is needed to attain an operation of sufficient accuracy. The upper limit of the shutter speed of the mechanical shutter is generally on the order of 1/1000 seconds. In addition, even if an aperture-priority mode is set to control exposure with shutter time, it is impossible to control the exposure with high accuracy.

A further advanced arrangement is known in which, during high-speed continuous shooting, exposure time (charge storage time) is controlled by means of an electronic shutter with the mechanical shutter kept fully open.

However, in the image sensing apparatus for still image which uses, as described above, the image sensor the latitude of which is narrow compared to silver-salt film, it is not easy to gain sufficient accuracy in the control of both the aperture diameter and the exposure time, resulting in the disadvantage that a costly arrangement is required.

To cope with the problem of cost increase, one method is considered in which the accuracy of the aperture diameter is improved by stepwise changing the aperture diameter within a restricted number of steps without continuously changing the aperture diameter. This method has the disadvantages that it is necessary to incorporate a shutter and a diaphragm separately and that a high degree of shutter accuracy is still needed.

It may also be considered possible to overcome the aforesaid problem of cost increase by using a set of blades as a diaphragm and a shutter to reduce the number of parts used. However, to control accurately the opening size formed by the blades, it is necessary to lower the operating speed of the blades, thus leading to the disadvantage that a high-speed shutter operation is difficult to achieve, which is unfavorable for operational characteristics.

This disadvantage not only makes it difficult to achieve a high-speed shutter operation but also constitutes a cause of bringing about the disadvantage of reducing the range (of subject luminance) in which a flash unit can be utilized for so-called fill-in flash photography in which flashing is used to prevent a subject against the high-luminance background from becoming dark to an imperceptible extent, so that the probability that a situation in which such a backlighting compensation is impossible is encountered becomes high.

Another arrangement which utilizes a motor to drive the blades employs a method of stabilizing the opening size by stopping the blades by ceasing the supply of electricity to the blade-opening motor or by energizing it in the reverse direction. In such a method, the moving speeds of the blades vary depending on a voltage applied to the motor, and even if a blade-stopping operation is carried out for the same aperture diameter, an error occurring until the blades actually stop varies and the aperture diameter does not stabilize. To avoid this disadvantage, it is necessary to use means for calculating a correct exposure time by again measuring light which passes through an actual aperture after the stabilization of the aperture diameter, means for stabilizing a voltage applied to the motor to stabilize the aperture diameter, etc. Therefore, a simple system will not be obtained.

SUMMARY OF THE INVENTION

It is, therefore, a first object of the present invention to provide an image sensing apparatus which has a shutter operable with an improved accuracy and whose mechanism can be simplified.

It is a second object of the present invention to provide an image sensing apparatus which is arranged to control accurately electrically the time point of start of charge storage time by causing a solid-state image sensor to start its charge storage operation upon completion of a charge sweep-out operation for photoelectric conversion elements, whereby it is possible to achieve a wide range of shutter speeds from a high-speed shutter operation to a low-speed shutter operation for long-time exposure.

To achieve the above-described objects, according to one aspect of the present invention, there is provided an image sensing apparatus which is provided with a solid-state image sensor capable of sweeping out electric charges therefrom, a mechanical shutter and control means for controlling the time period from the time point at which the electric charges of the solid-state image sensor are swept out when the mechanical shutter is in its open state to the time point at which the mechanical shutter is closed.

It is a third object of the present invention to provide an image sensing apparatus which is capable of effectively using an electronic shutter and an optical shutter to prevent a smear from occurring during the control of the electronic shutter, and of achieving highly accurate exposure control by preventing uneven exposure due to variations in the operation of the optical shutter.

To achieve the above-described object, according to another aspect of the present invention, there is provided an image sensing apparatus which includes optical light-blocking means and image sensing means capable of clearing image information therefrom and permitting image information to be read out therefrom for the purpose of controlling charge storage time, the image sensing means being provided with a first read-out mode in which information is read out from effective pixels by a single read-out operation and a second read-out mode in which the information is read out from the effective pixels separately by a plurality of read-out operations. When the image sensing means is operative in the second read-out mode, the charge storage time of the image sensing means is set by controlling the image-information clearing operation of the image sensing means and the light-blocking operation of the optical light-blocking means.

It is a fourth object of the present invention to provide an image sensing apparatus which is arranged to prevent deterioration of image quality, such as a smear, during the operation of reading out all pixel information from an image sensor separately by a plurality of times.

To achieve the above-described object, according to another aspect of the present invention, there is provided an image sensing apparatus which includes image sensing means whose charge storage time is controllable, optical light-blocking means and illumination means. The image sensing apparatus is arranged to perform control of substantial charge storage time without using the optical light-blocking means during the execution of imaging using the illumination means.

It is another object of the present invention to provide an image sensing apparatus which is capable of achieving a highly accurate aperture diameter and shutter speed even during the use of an electronic flash unit, and which is capable of achieving such an accurate aperture diameter and, even during a high-speed shutter operation, an accurate fully open aperture at any time in any photography mode, whereby it is possible to perform fill-in flash under various conditions according to a wide range of subject luminance.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 1 is a timing chart showing a first embodiment of an image sensing apparatus according to the present invention;

FIGS. 4 and 5 are timing chart showing different examples of the operation of the first embodiment;

FIG. 19 is a chart showing the timing of the operation of the half open shutter.

DETAILED DESCRIPTION OF THE PREFERRED EMBODIMENTS

Preferred embodiments of the present invention will be described below in detail with reference to the accompanying drawings.

Figure 3:
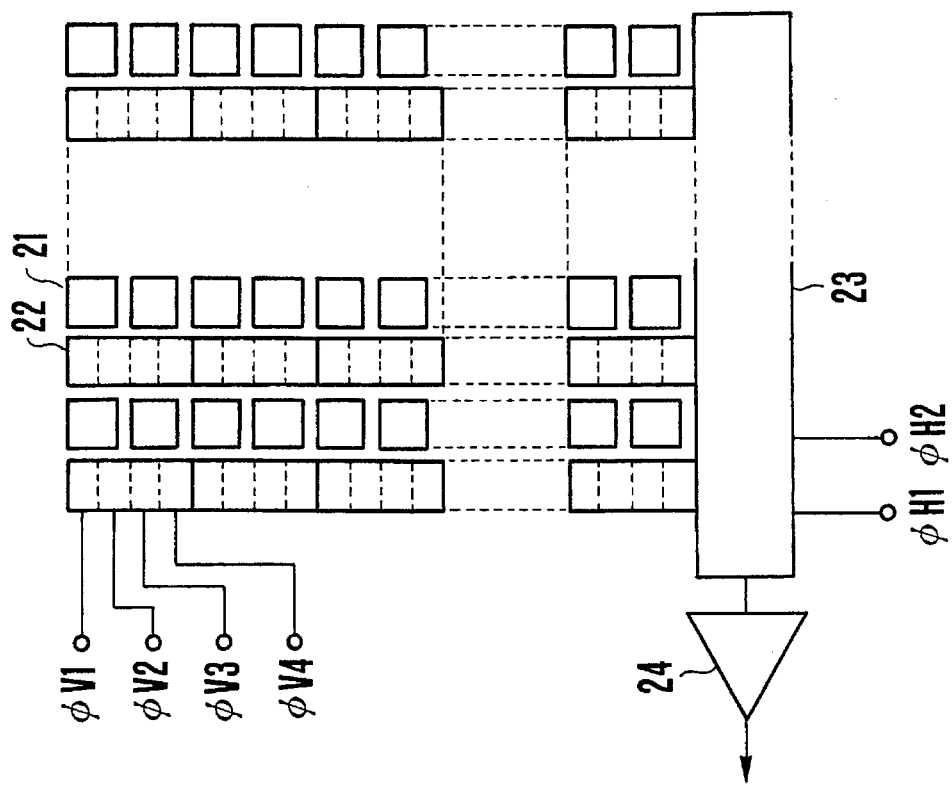
FIG. 3 is a schematic block diagram showing a solid-state image sensor used in the first embodiment.
Figure 2:
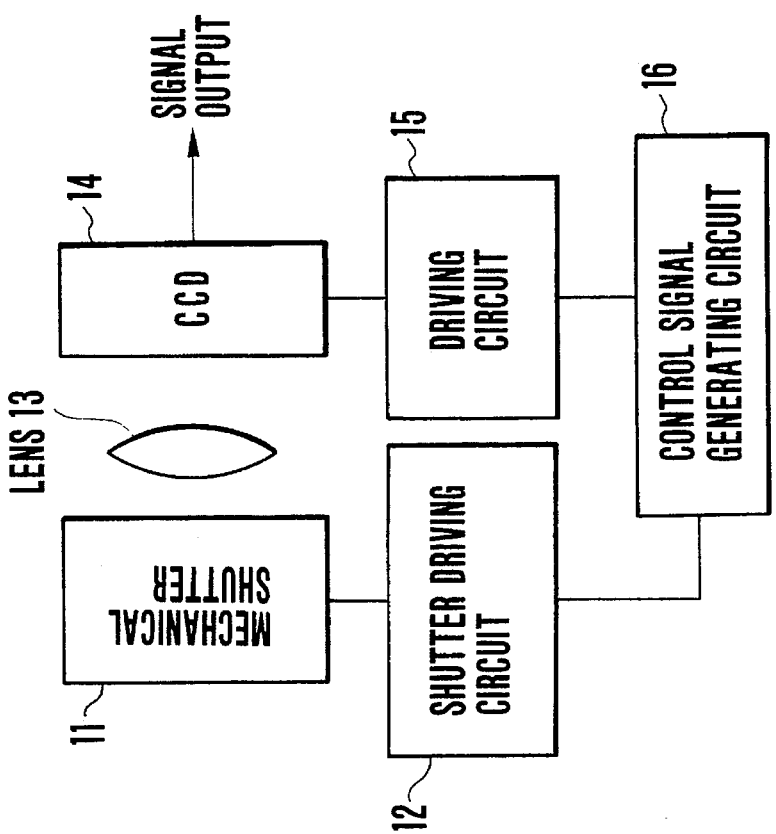
FIG. 2 is a schematic block diagram showing the construction of the first embodiment.

FIG. 1 shows one example of a timing chart of the operation of a still video camera according to a first embodiment of the present invention, and FIG. 2 is a schematic view showing the construction of the first embodiment. FIG. 3 is a schematic view showing the construction of an interline CCD (charge-coupled device) image sensor used in the embodiment.

Referring to FIG. 3, elements 21 are photoelectric conversion elements. Vertical CCDs 22 (each array of which constitutes a vertical transfer shift register) have first to fourth vertical transfer electrodes each. Each of the vertical CCDs 22 is driven by applying four-phase pulses $\phi V1$ to $\phi V4$ to the respective first to fourth vertical transfer electrodes. The photoelectric conversion elements 21 along odd lines are connected to the respective first vertical transfer electrodes, while the photoelectric conversion elements 21 along even lines are connected to the respective third vertical transfer electrodes. The first vertical transfer electrodes serve as transfer gates for transferring electric charges from the odd-line photoelectric conversion elements 21 to the adjacent vertical CCDs 22, and the third vertical transfer electrodes serve as transfer gates for transferring electric charges from the even-line photoelectric conversion elements 21 to the adjacent vertical CCDs 22. A horizontal CCD register 23 has first and second horizontal transfer electrodes, and is driven by applying two-phase pulses $\phi H1$ and $\phi H2$ to the respective first and second horizontal transfer electrodes. A circuit 24 is an output circuit such as an emitter-follower circuit. The above-described interline CCD image sensor can be made to sweep out the electric charges of the photoelectric conversion elements 21 into a substrate by applying a voltage to the substrate which this sensor itself overlies.

FIG. 2 is a block diagram schematically showing the construction of the image sensing apparatus according to the first embodiment. The shown image sensing apparatus includes a mechanical shutter 11, a shutter driving circuit 12, a lens 13, a solid-state image sensor 14, a driving circuit 15 for the solid-state image sensor 14, and a control signal generating circuit 16. Timing to open and close the mechanical shutter 11 and timing to apply a charge sweep-out pulse to the solid-state image sensor 14 are determined by the control signal generating circuit 16. The mechanical shutter 11 and the solid-state image sensor 14 are controlled by the driving circuits 12 and 15, respectively.

FIG. 1 shows one example of a timing chart of the operation of a still video camera which employs the interline CCD image sensor of FIG. 3 as the solid-state image sensor 14 of FIG. 2. The part "STATE OF SHUTTER" of FIG. 1 shows the state of opening and closing of the mechanical shutter 11. Reference numeral 1 denotes a sweep-out pulse φES which is applied to the interline CCD image sensor (solid-state image sensor) 14 for the purpose of sweeping out the electric charges of the photoelectric conversion elements 21. Reference numeral 2 denotes the time period required from the time point of completion of a charge sweep-out operation until the mechanical shutter 11 is closed, and represents charge storage time which is controlled by the control signal generating circuit 16 shown in FIG. 2. Reference numerals 3 to 6 denote vertical transfer pulses among pulses for driving the vertical CCDs 22 of the interline CCD image sensor 14. Reference numerals 7 and 8 respectively denote first and second read-out pulses for transferring the electric charges of the photoelectric conversion elements 21 to the vertical CCDs 22. In this embodiment, a so-called field read-out output is realized, that is, after the first read-out pulse 7 has been applied to each of the first vertical transfer electrodes, the read electric charge is transferred to a region below the associated third vertical transfer electrode, and the second read-out pulse 8 is applied to each of the third vertical transfer electrodes, thereby adding together the electric charges of each vertical pair of the photoelectric conversion elements 21. As shown in FIG. 1, the charge storage time 2 of the photoelectric conversion elements 21 is determined by the time period required from the time point of completion of the charge sweep-out operation until the mechanical shutter 11 is closed. Accordingly, it is possible to control arbitrarily the charge storage time 2 by changing the position of the sweep-out pulse φES.

FIG. 4 shows another example of the tinting chart of the operation of the first embodiment. In this example, timing to open the mechanical shutter 11 and timing to apply the charge sweep-out pulse φES are set at positions beyond a vertical blanking period. With such a timing setting, it is possible to realize the charge storage time 2 of long time duration.

FIG. 5 shows another example of the timing chart of the operation of the first embodiment, in which reference numerals 33 to 36 denote high-speed transfer pulses for driving the vertical CCDs 22 at high speed. With the shown timing setting, since the vertical CCDs 22 are driven at high speed during the closed state of the mechanical shutter 11 after the completion of the charge storage time 2, it is possible to eliminate unwanted electric charges which are produced in the vertical CCDs 22 due to light incident thereon during the charge storage time 2 and may cause problems such as a smear or blooming.

It is to be noted that although the aforesaid embodiment uses the interline CCD image sensor as a solid-state image sensor, the range of applications of the present invention is not limited to the interline CCD image sensor. For example, a frame transfer device or a frame inter-transfer device may be employed, and a charge transfer device other than a CCD may also be employed.

The mechanical shutter may be of a type which serves also as a diaphragm.

The timing to open and close the mechanical shutter and the timing to apply the charge sweep-out to the solid-state image sensor may be made variable for the timing to apply the charge read-out pulses, or timing to open the mechanical shutter and timing to apply the charge sweep-out pulse may be made variable for the aforesaid timing, or only the timing to apply the charge sweep-out pulse may be made variable for the aforesaid timing.

The vertical transfer pulses 3 to 6 may be omitted except for the vertical transfer pulses 3 and 5 which follow the first and second read-out pulses 7 and 8, respectively.

As is apparent from the foregoing description, according to the first embodiment, since the charge storage operation of the solid-state image sensor is started upon completion of the charge sweep-out operation of the photoelectric conversion elements, it is possible to control the time point of start of the charge storage time electrically accurately, whereby a wide range of shutter speeds from a high-speed shutter operation to a low-speed shutter operation for long-time exposure can be achieved.

Since the opening operation of the mechanical shutter does not require strict accuracy, it is possible to simplify the entire shutter mechanism.

A second embodiment of the present invention will be described below. The second embodiment discloses a specific form of image sensing apparatus provided with a field photography mode, a frame photography mode, an EF mode using an electronic flash unit, a non-EF mode using no electronic flash unit, and the like. This image sensing apparatus can at all times achieve optimum exposure control by means of an optical shutter and an electronic shutter.

Figure 6:
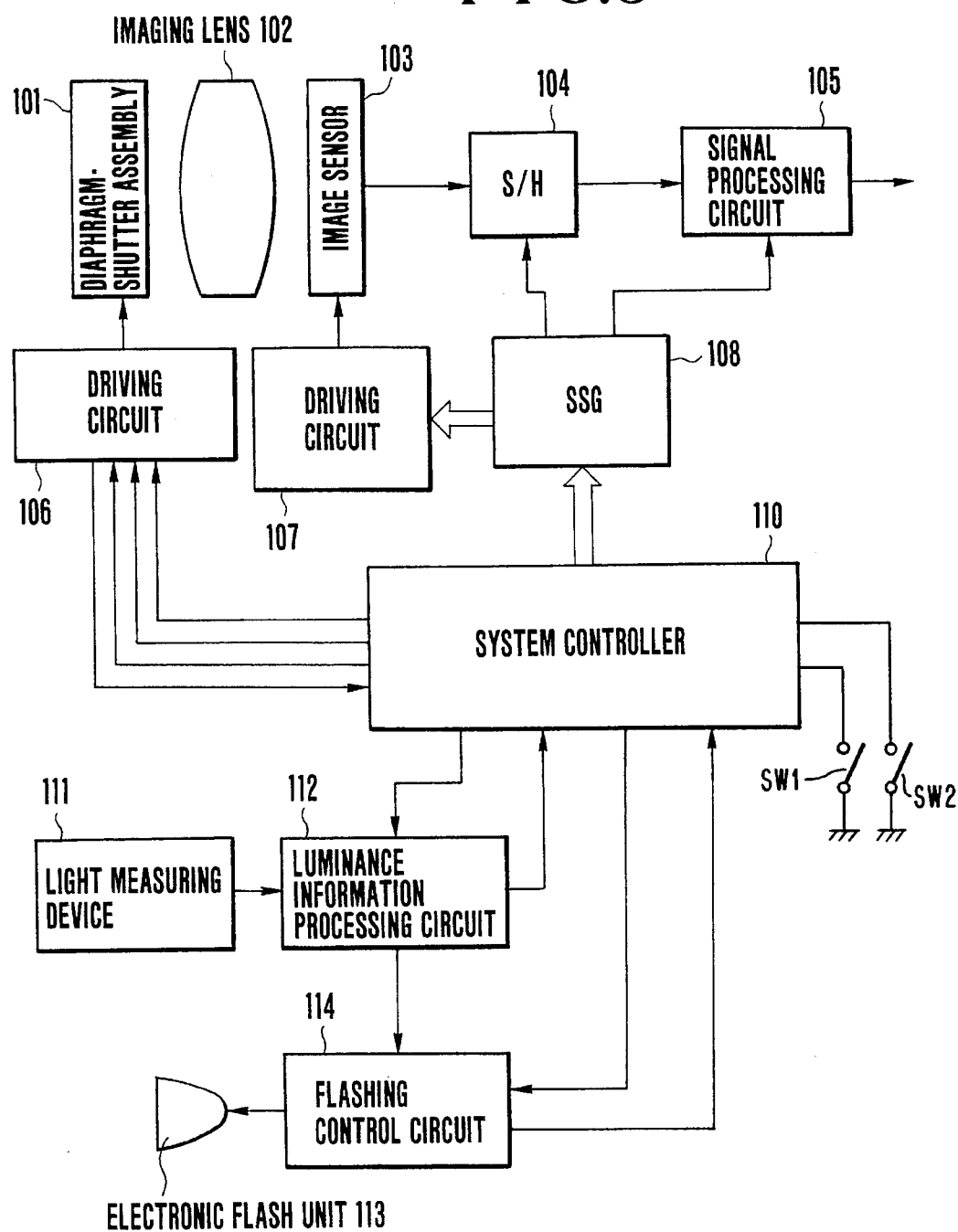
FIG. 6 is a schematic block diagram showing a second embodiment of the image sensing apparatus according to the present invention.

FIG. 6 is a block diagram schematically showing the second embodiment of an image sensing apparatus according to the present invention. The shown image sensing apparatus includes a half open shutter 101 which serves both as a shutter and a diaphragm for adjusting the amount of incident light, an imaging lens 102, an image sensor 103 (such as a CCD) for converting an optical image of a subject formed by the imaging lens 102 into an electrical signal, a sample-and-hold circuit (or a CDS circuit, hereinafter called an "S/H circuit") 104 for converting a temporally discrete form of image signal obtained through such photoelectric conversion by the image sensor 103 into a continuous form of image signal, a signal processing circuit 105 for converting the continuous form of image signal formed by the S/H circuit 104 in accordance with individual applications (the signal processing circuit 105 performs processing associated with the linearity of a dynamic range, such as gamma correction, knee processing, digital processing, conversion of a signal of primary or complementary colors outputted from the image sensor 103 into a luminance signal and color-difference signals, and so on), a driving circuit 106 for driving the half open shutter 101 in accordance with control provided by a system controller 110 which will be described later, a driving circuit 107 for driving the image sensor 103, a sync signal generator (SSG) 108 for generating clock pulses to drive and synchronize the image sensor 103, the S/H circuit 104 and the signal processing circuit 105, the system controller 110 consisting of, for example, a microcomputer and controlling the entire image sensing apparatus for still image according to the second embodiment, a light measuring device 111 for measuring the luminance of the subject, a luminance information processing circuit 112 for applying logarithmic compression or weighting to the output of the light measuring device 111 or for comparing the output with a predetermined value for the purpose of flashing control of an electronic flash unit 113 which will be described below, the electronic flash unit 113 for auxiliary illumination of the subject, and a control circuit (hereinafter called a "flashing control circuit") 114 for controlling the voltage, flashing and flash intensity of the electronic flash unit 113.

A half open shutter mechanism used in the present invention will be described below with reference to FIGS. 6 to 10 in due order from the background.

In general, to gain further reductions in cost and size and to cover a far wider exposure range, it is necessary to provide such a half open shutter mechanism with a diaphragm function as well as a shutter function. In addition, it is necessary to provide diaphragm control with extremely high accuracy since the exposure latitude of still video cameras is narrow.

To clarify the feature of the half open shutter mechanism used in the present invention, the following explanation is made in relation to a conventional diaphragm mechanism.

The conventional diaphragm mechanism will be described with reference to FIG. 16. A diaphragm circular plate 203 is crosswise inserted in the photographic optical path between a photographic lens 201 and an image sensor 202 and is supported for rotation about its axis with respect to the photographic optical path. The diaphragm circular plate 203 has a plurality of openings corresponding to different aperture diameters, and the outer periphery has a plurality of claws 203a corresponding to the respective openings as well as an engagement projection 203b and a toothed portion 203c. A charge pin 203d is disposed to extend from one face of the diaphragm circular plate 203. The diaphragm circular plate 203 is urged counterclockwise as viewed in FIG. 16 by a spring 204. During a charged state, a holding lever 205 is maintained in engagement with the engagement projection 203b so that an opening corresponding to a fully open aperture diameter is set in the photographic optical path.

Figure 16:
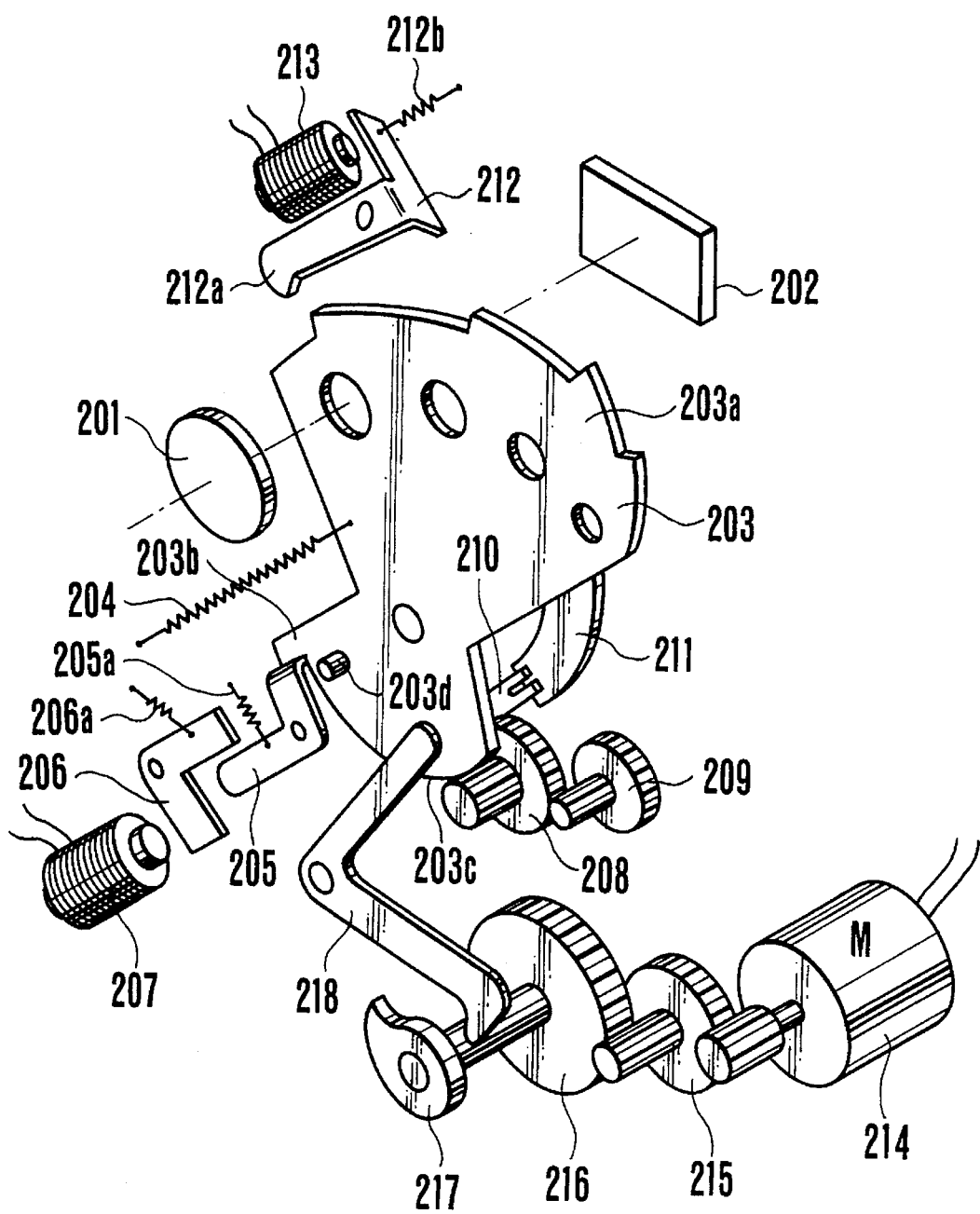
FIG. 16 is an exploded, perspective view diagrammatically showing an example of a conventional shutter.

When a shutter-release electromagnet 207 is energized, an actuating lever 206 is attracted against a spring 206a to turn clockwise as viewed in FIG. 16. The actuating lever 206 causes the holding lever 205 to turn against a spring 205a counterclockwise as viewed in FIG. 16, thereby disengaging the holding lever 205 from the engagement projection 203b of the diaphragm circular plate 203. Thus, the diaphragm circular plate 203 turns counterclockwise by the force of the spring 204 with its turning speed reduced by speed reducing governor gears 208 and 209 meshed with the toothed portion 203c.

When the diaphragm circular plate 203 rotates to a position where an opening corresponding to a desired aperture diameter is set in the photographic optical path, a corresponding position signal is outputted from a printed circuit board 211 in contact with a contact piece 210 secured to the diaphragm circular plate 203. An engagement electromagnet 213 is energized to attract an engagement lever 212 against the urging force of a spring 212b, and a claw 212a of the engagement lever 212 is brought into engagement with one selected claw of the claws 203a of the diaphragm circular plate 203. Thus, the diaphragm circular plate 203 is brought to a stop and the desired diaphragm diameter is set.

When photography is ended, a charge motor 214 is driven in response to a corresponding end signal and causes a cam plate 217 to rotate through gears 215 and 216, thereby turning the charge lever 218 counterclockwise as viewed in FIG. 16. The charge lever 218 is brought into abutment with the charge pin 203d of the diaphragm circular plate 203 to cause the diaphragm circular plate 203 to turn clockwise against the urging force of the spring 204. The holding lever 205 is brought into engagement with the engagement projection 203b and the diaphragm circular plate 203 is held in its charged position.

However, in the above-described conventional example, if the kinds of aperture diameters are to be increased to realize fine exposure control, it is necessary to increase the size of the diaphragm mechanism. If a CCD is used as an image sensor, field photography will be possible by using the above-described conventional diaphragm mechanism and a CCD electronic shutter, but during frame photography, light toward the CCD needs to be blocked while signals are being read out from the CCD.

For these reasons, the conventional art has the problem that a mechanical shutter mechanism such as a focal plane shutter is needed in addition to the diaphragm mechanism explained as the conventional example.

The shutter used in the present invention is a half open shutter which solves the above-described problems and which can achieve both a plurality of highly accurate aperture-diameter controls and blockage of light rays by means of a common arrangement.

Specifically, the shutter used in the present invention is an electromagnetically driven half open shutter which is arranged to open shutter blades in interlocked relation to the forward rotation of a motor and to close the shutter blades in response to the operation of a control magnet. The electromagnetically driven half open shutter includes a claw member which moves in interlocked relation to the operation of the control magnet, a shutter-blade driving member the operation of which is restricted by engagement with the claw member, a charge member which is made to move by the forward rotation of the motor in the state of abutment with the shutter-blade driving member to thereby open the shutter blades and, after a predetermined position has been reached, is made to return to its initial position by the reverse rotation of the motor, and signal generating means for generating a signal corresponding to the running position of the shutter blades. The electromagnetically driven half open shutter is arranged to hold the shutter blades at a predetermined opening size by controlling the forward and reverse rotations of the motor in accordance with the output of the signal generating means, and thereafter close the shutter blades in response to the operation of the control magnet.

As described above, the electromagnetically driven half open shutter includes the claw member which is interlocked with the operation of the control magnet, the shutter-blade driving member the operation of which is restricted by engagement with the claw member, the charge member which is made to move by the forward rotation of the motor in the state of abutment with the shutter-blade driving member to thereby open the shutter blades and, after a predetermined position has been reached, brings the claw member into engagement with the shutter-blade driving member by the reverse rotation of the motor to thereby hold the shutter blades at a predetermined opening size, returning to its initial position, and signal generating means for generating a signal corresponding to the running position of the shutter blades. The electromagnetically driven half open shutter is arranged to hold the shutter blades at a predetermined opening size by controlling the forward and reverse rotations of the motor in accordance with the output of the signal generating means, and thereafter close the shutter blades by releasing the engagement between the claw member and the shutter-blade driving member in response to the operation of the control magnet. Accordingly, it is possible to achieve both a plurality of highly accurate aperture-diameter controls and blockage of light rays by means of a single half open shutter.

Figure 17:
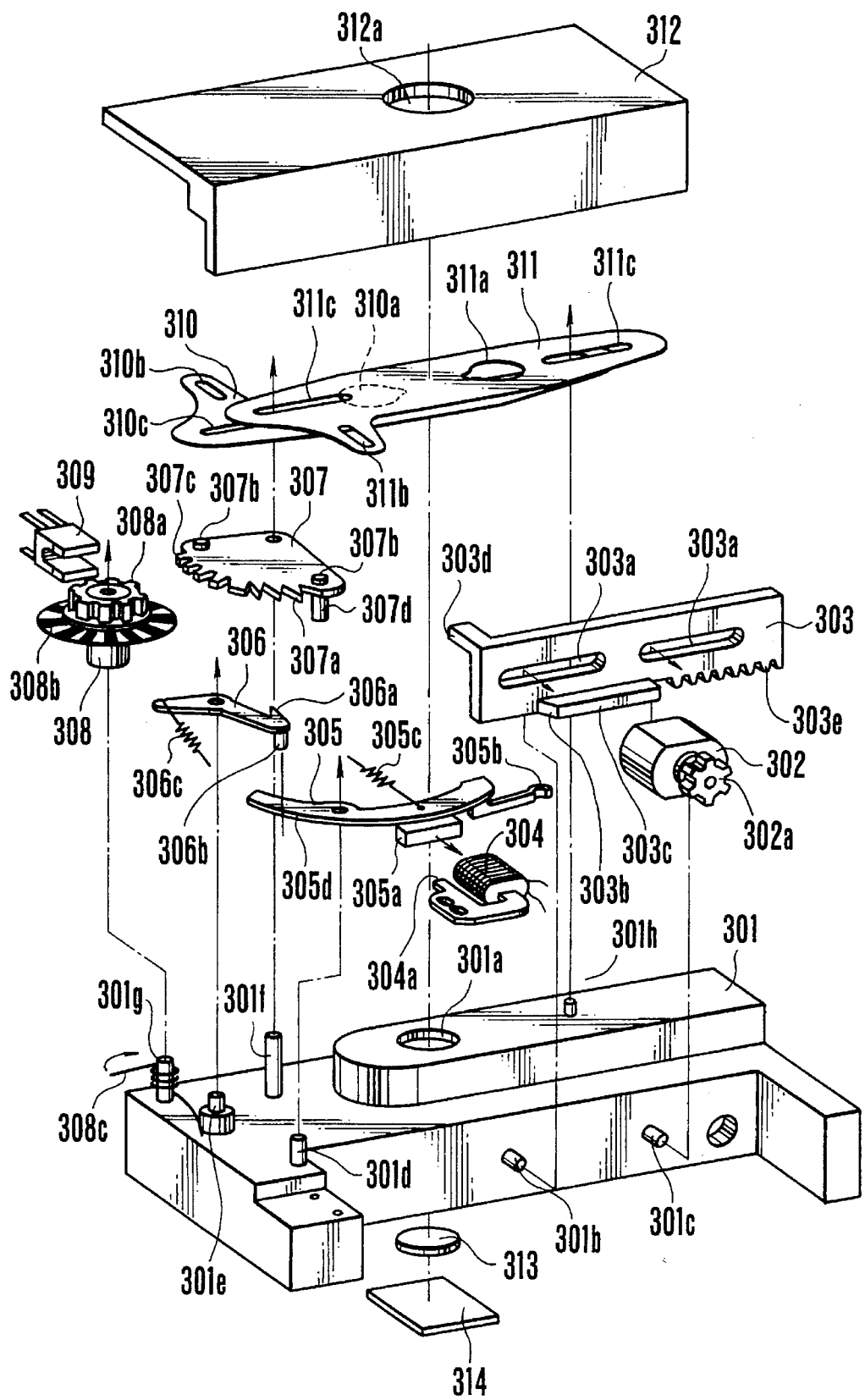
FIG. 17 is an exploded, perspective view diagrammatically showing a half open shutter used in the present invention.

FIG. 17 is an exploded, perspective view schematically showing a first example of the half open shutter used in the present invention. Referring to FIG. 17, a base plate 301 serves as the constructional base of the half open shutter, and integrally constitutes an opening 301a through which light rays pass, shafts for holding various actuating members which will be described below, and so on.

A reversible motor 302 serves as a drive source and an output gear 302a for transmission of driving force is secured to the rotary shaft of the motor 302. A charge member 303 has a toothed portion 303e to which the driving force is transmitted from the motor 302 through a gear train which is not shown. Shafts 301b and 301c formed at two positions on the base plate 301 are inserted in respective slots 303a so that the charge member 303 is held movably in the rightward and leftward directions as viewed in FIG. 17. The charge member 303 further has a projection 303d, a tapered surface 303b, and a flat projection 303c having a length greater than or approximately equal to the length of the slot 303a.

A control magnet 304 is of a type which produces attraction and repulsion electromagnetically. A magnet lever 305 is held for rotation about a shaft 301d of the base plate 301, and has an armature 305a which is tightly attracted to an attracting portion 304a of the control magnet 304, a charge portion 305b being formed integrally with the magnet lever 305 and having springy properties, a magnet spring 305c having its spring force selected to be weaker than a retaining attraction produced by the control magnet 304 during energization so that the armature 305a can be removed from the control magnet 304 when the control magnet 304 is deenergized, and an arm 305d which is formed to be able to come into abutment with a claw projection 306b of a claw member 306. When the control magnet 304 is not energized, the arm 305d is brought into abutment with the claw projection 306b, causing the claw member 306 to turn against a claw spring 306c in the clockwise direction as viewed in FIG. 17. The claw member 306 is held for turning motion about a shaft 301e of the base plate 301.

A shutter-blade driving member 307 is held for turning motion about a shaft 301f of the base plate 301, and has a notched portion 307a with which the claw portion 306a engages and which sets the opening size formed by shutter blades 310 and 311 to a desired aperture value, projections 307b which are inserted in slots 310b and 311b of the respective shutter blades 310 and 311, and a toothed portion 307c.

A pulse gear 308 meshes with the toothed portion 307c of the shutter-blade driving member 307 through a gear portion 308a, and has an integral pulse disc 308b with a pattern consisting of parts having different transmission efficiencies for incident light rays and is held for turning motion about a shaft 301g of the base plate 301. A shutter spring 308c urges the pulse gear 308 clockwise as viewed in FIG. 17 to urge the shutter-blade driving member 307 counterclockwise, thereby holding the shutter blades 310 and 311 in a closed state.

A photointerrupter 309 carries out position detection as to the shutter blades 310 and 311 by converting variations in the pattern with the turning of the pulse disc 308b into an electrical signal. The shutter blades 310 and 311 are held for movement in the rightward and leftward directions as viewed in FIG. 17 by means of slots 310c and 311c and the shaft 301f as well as a shaft 301h, the shafts 301f and 301h being formed at two positions on the base plate 301. The shutter blades 310 and 311 are made to slide in opposite directions relative to each other by the shutter-blade driving member 307, thereby changing the degree of overlap of openings 310a and 311a to vary the opening 301a of the base plate 301 from a closed state to a fully open state or vice versa.

A cover 312 has an opening 312a for passing light rays, similarly to the opening 301a of the base plate 301, and holds the individual members, which constitute the half open shutter, on the base plate 301 so that they can perform their respective functions. An image sensor 314, such as a CCD, converts an image formed by a lens part 313 into an electrical signal for recording purposes.

Figure 18A:
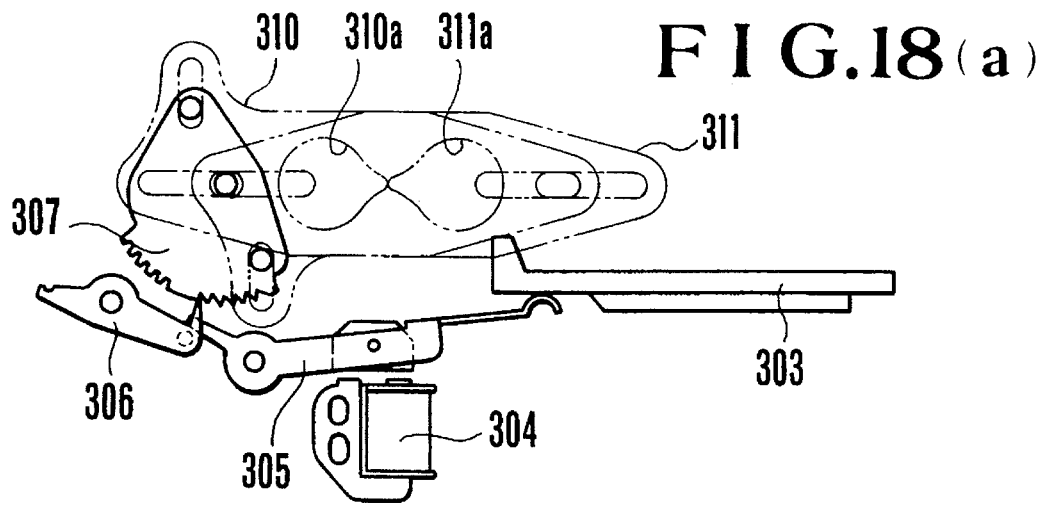
FIGS. 18(a), 18(b) and 18(c) are schematic explanatory views of the operation of the half open shutter of FIG. 16.

FIGS. 18(a), 18(b), 18(c) and 19 are explanatory views showing the operation of the half open shutter shown in FIG. 17. FIG. 18(a) shows the initial state of the half open shutter in which, as viewed in FIG. 17, the shutter blades 310 and 311 are in the state of covering the opening 310a of the base plate 301 and the opening 312a of the cover 312. In this state, when the motor 302 is driven forward, the charge member 303 is made to move leftward as viewed in FIG. 18(a) through a gear train which is not shown. Immediately before or after the forward drive of the motor 302, the control magnet 304 is energized.

Then, the tapered surface 303b of the charge member 303 forces the charge portion 305b downward as viewed in FIG. 8(a). Therefore, the armature 305a overcomes the force of the magnet spring 305c and is pressed against the attracting portion 304a of the control magnet 304, thus being attracted to the control magnet 304. The charge portion 305b is provided with the springy properties so that the armature 305a can be securely pressed against the control magnet 304, and the projection height of the flat projection 303c is selected so that the shutter can be overcharged.

The charge member 303 moves further leftward and the projection 303d comes into abutment with an abutment portion 307d of the shutter-blade driving member 307 to cause the shutter-blade driving member 307 to turn clockwise as viewed in FIG. 18(a) against the urging force of the shutter spring 308c. Simultaneously, the shutter-blade driving member 307 causes the pulse gear 308 to turn counterclockwise as viewed in FIG. 18(a), thereby causing the photointerrupter 309 to generate pulse signals. During this time, since the shutter blade 310 moves to the right and the shutter blade 311 to the left, an aperture is formed by the openings 310a and 311a of the respective shutter blades 310 and 311.

Figure 18B:
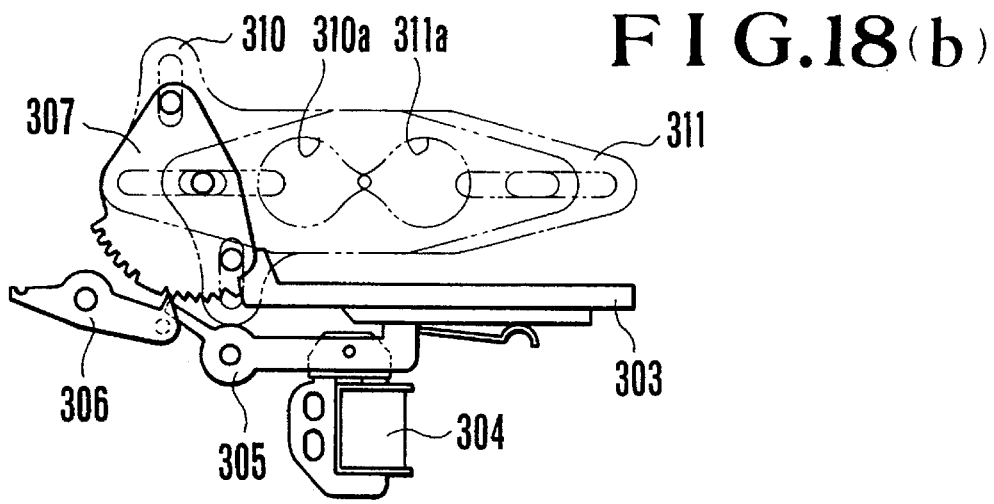

During this time, the claw member 306 sequentially changes its position of mesh along the notched portion 307a of the shutter-blade driving member 307. This state is shown in FIG. 18(b). In this state, when the aperture opens slightly beyond a size corresponding to a predetermined aperture value calculated from the output of a light measuring device which is not shown, that is, when the timing at which the claw portion 306a moves over a predetermined notch of the notched portion 307a is detected through the pulse signals from the photointerrupter 309, the motor 302 is reversed to return the charge member 303 to the initial position thereof. The shutter-blade driving member 307 is kept meshed with the claw portion 306a, whereby a predetermined aperture value is set. This is the state shown in FIG. 18(c).

Thereafter, correct exposure is performed on the basis of the combination between the electronic shutter of the image sensor 314 such as a CCD and the set aperture value. In other words, during field photography, the half open shutter of the present invention functions as a diaphragm only and exposure is performed by the electronic shutter. During this time, the electronic shutter may be continuously operated, and each time it is operated once, an image signal from the image sensor 314 may be recorded on a recording medium (not shown) such as a floppy disc. With this operation, it is possible to easily achieve not only single shooting but also continuous shooting.

Figure 18C:
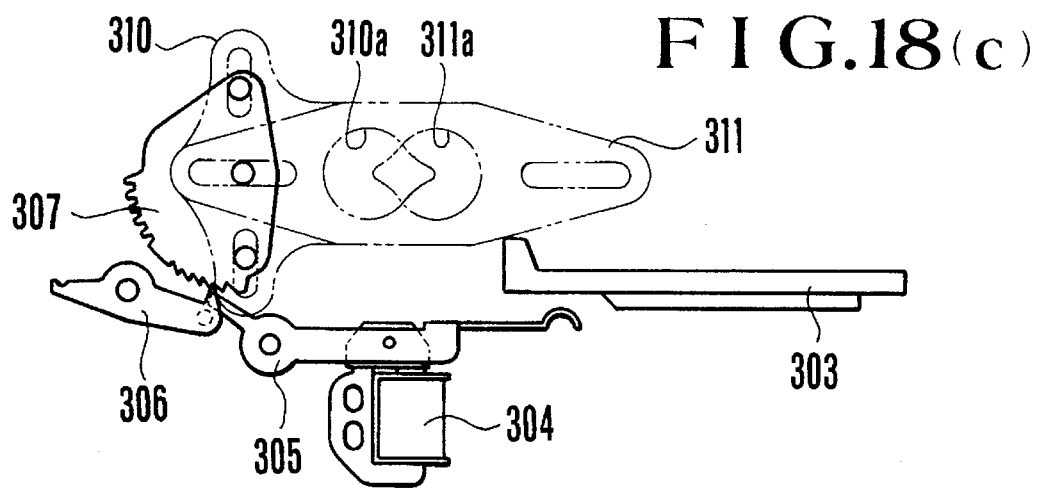

When the exposure and photography by the electronic shutter are brought to an end, the energization of the control magnet 304 is stopped and the magnet lever 305 turns counterclockwise as viewed in FIG. 18(c), and the arm 305d pushes the claw projection 306b to cause the claw member 306 to turn clockwise, thereby disengaging the claw portion 306a from the notched portion 307a. Therefore, the shutter-blade driving member 307 is made to turn counterclockwise through the pulse gear 308 by the shutter spring 308c, causing the shutter blades 310 and 311 to return to their initial states, i.e., the states shown in FIG. 18(a). Thus, the openings 301a and 312a are covered and the exposure is completed. Further, an electrical signal representing the sensed image stored in the image sensor 314 is recorded on a recording medium such as a floppy disc (not shown), and a series of photographic operations is completed.

FIG. 19 is a timing chart showing the above-described operation, and the timing of the operation shown in FIG. 18(a) is shown at (a), the timing of the operation shown in FIG. 18(b) at (b), and the timing of the operation shown in FIG. 18(c) at (c). The image sensor 314 is arranged in such a manner that, in either of field photography and frame photography, all electric charges stored therein are cleared immediately before the image sensor 314 is driven. Accordingly, even if a shutter opening speed up to the setting of an aperture diameter varies to a certain extent, there is no problem if the aperture diameter of the shutter is set highly accurately.

Figure 20:
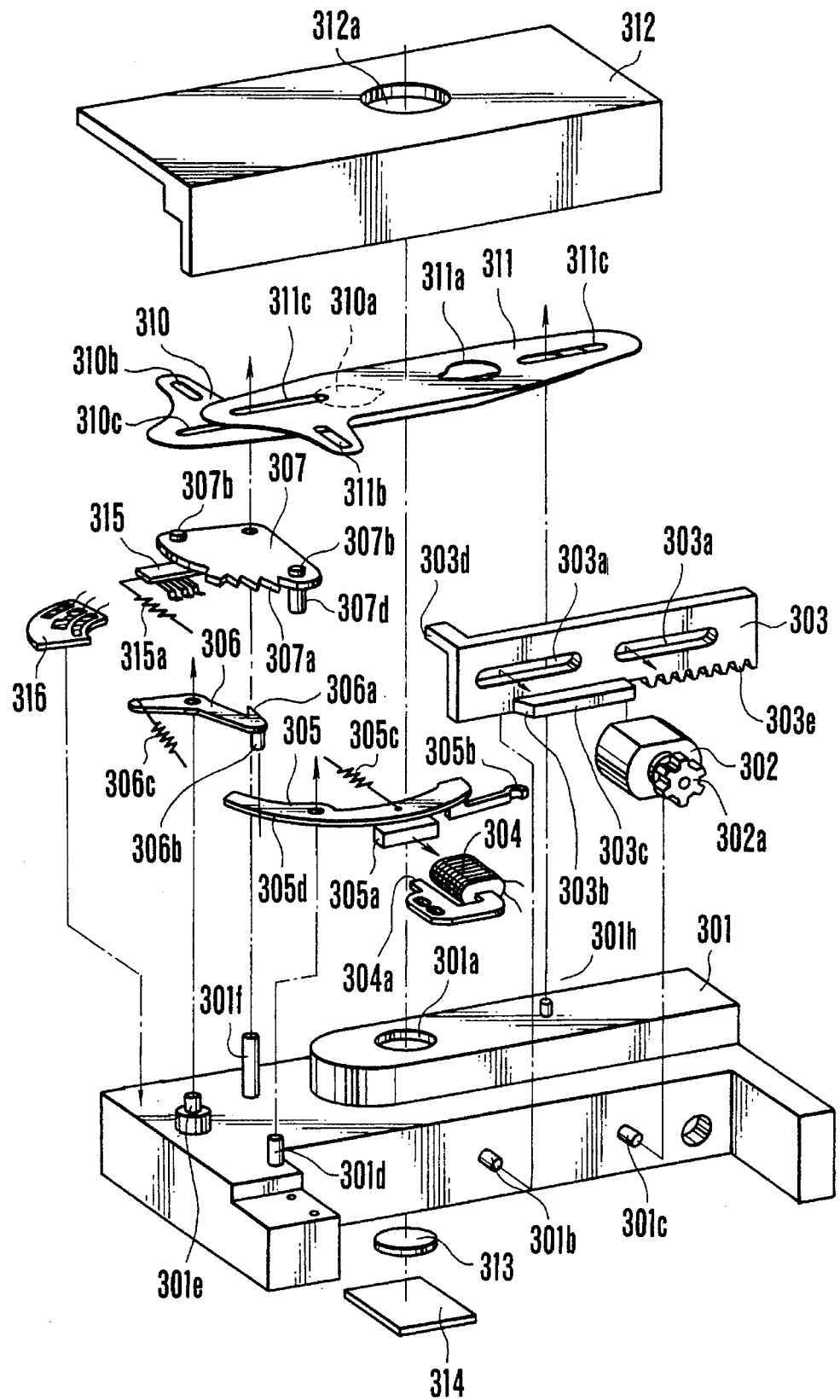
FIG. 20 is an exploded, perspective view diagrammatically showing another example of the half open shutter used in the present invention.

FIG. 20 is an exploded, perspective view schematically showing a second example of the half open shutter. In the second example, a brush 315, an encoder 316, etc., are used instead of the pulse gear 308, the photointerrupter 309, etc., which constitute signal generating means in the above-described first example. The brush 315 is fixed to the shutter-blade driving member 307, and a shutter spring 315a urges the shutter-blade driving member 307 counterclockwise as viewed in FIG. 20 (the shutter spring 315a performs a function similar to that of the shutter spring 308c in the above-described first example). The encoder 316 slides in contact with the brush 315 and outputs the rotational phase of the shutter-blade driving member 307 as an absolute-value signal so that absolute positions of the shutter blades 310 and 311 can be detected.

With the aforesaid arrangement, although the entire sequence is substantially the same as that of the first example, the control magnet 304 can be controlled far more accurately since the absolute positions of the shutter blades 310 and 311 are not influenced by the backlash of the pulse gear 308.

As described above, the electromagnetically driven half open shutter includes the claw member which moves in interlocked relation to the operation of the control magnet, the shutter-blade driving member the operation of which is restricted by engagement with the claw member, the charge member which is made to move by the forward rotation of the motor in the state of abutment with the shutter-blade driving member to thereby open the shutter blades and, after a predetermined position has been reached, is made to return to its initial position by the reverse rotation of the motor, and the signal generating means for generating a signal corresponding to the running position of the shutter blades. The electromagnetically driven half open shutter is arranged to hold the shutter blades at a predetermined opening size by controlling the forward and reverse rotations of the motor in accordance with the output of the signal generating means, and thereafter close the shutter blades in response to the operation of the control magnet. Accordingly, it is possible to set highly accurately the opening size to a fully open aperture or to an arbitrary aperture value selected from among a plurality of aperture values. The aforesaid electromagnetically driven half open shutter has the function of a mechanical shutter, whereby if such a mechanical-shutter function is combined with the electronic-shutter function of the image sensor, the electromagnetically driven half open shutter can function as a diaphragm during field photography and, during frame photography, as a diaphragm and a shutter responsible for a shutter closing operation. Accordingly, the electromagnetically driven half open shutter has the advantage of easily realizing a highly accurate operation.

Figure 13:
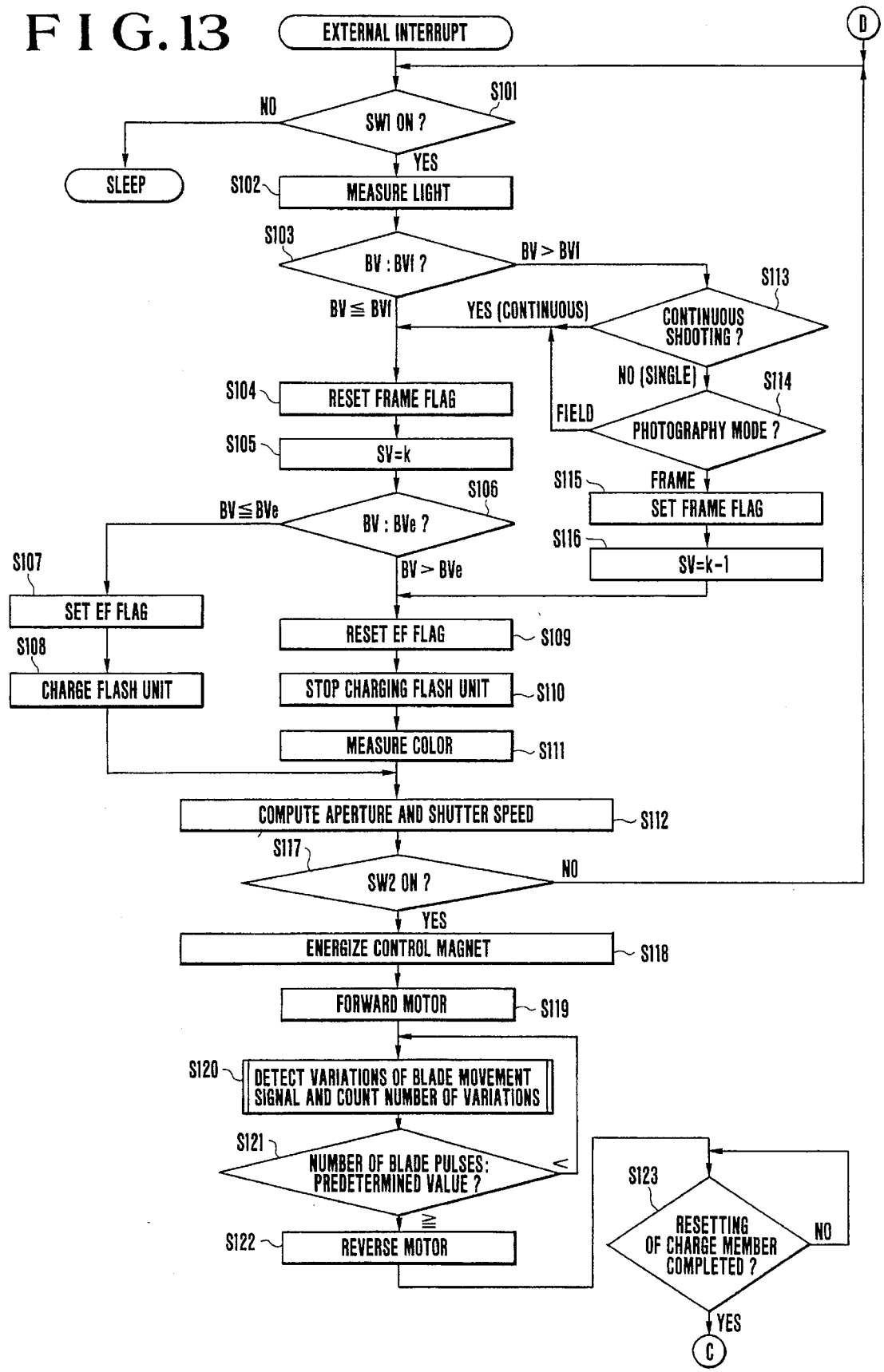
FIGS. 13 and 14 are explanatory flowcharts of the operation of another embodiment of the present invention.
Figure 14:
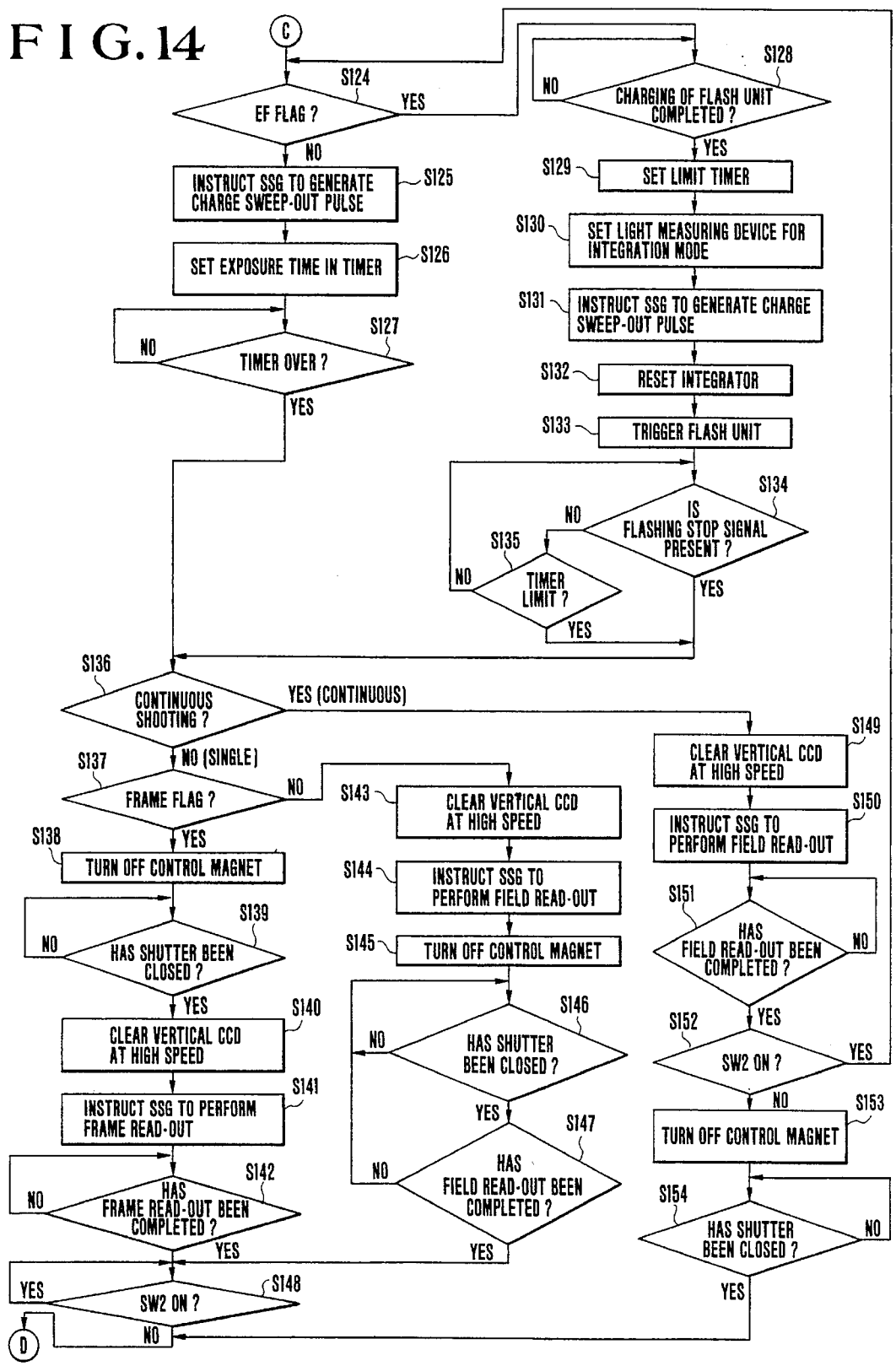
Figure 15:
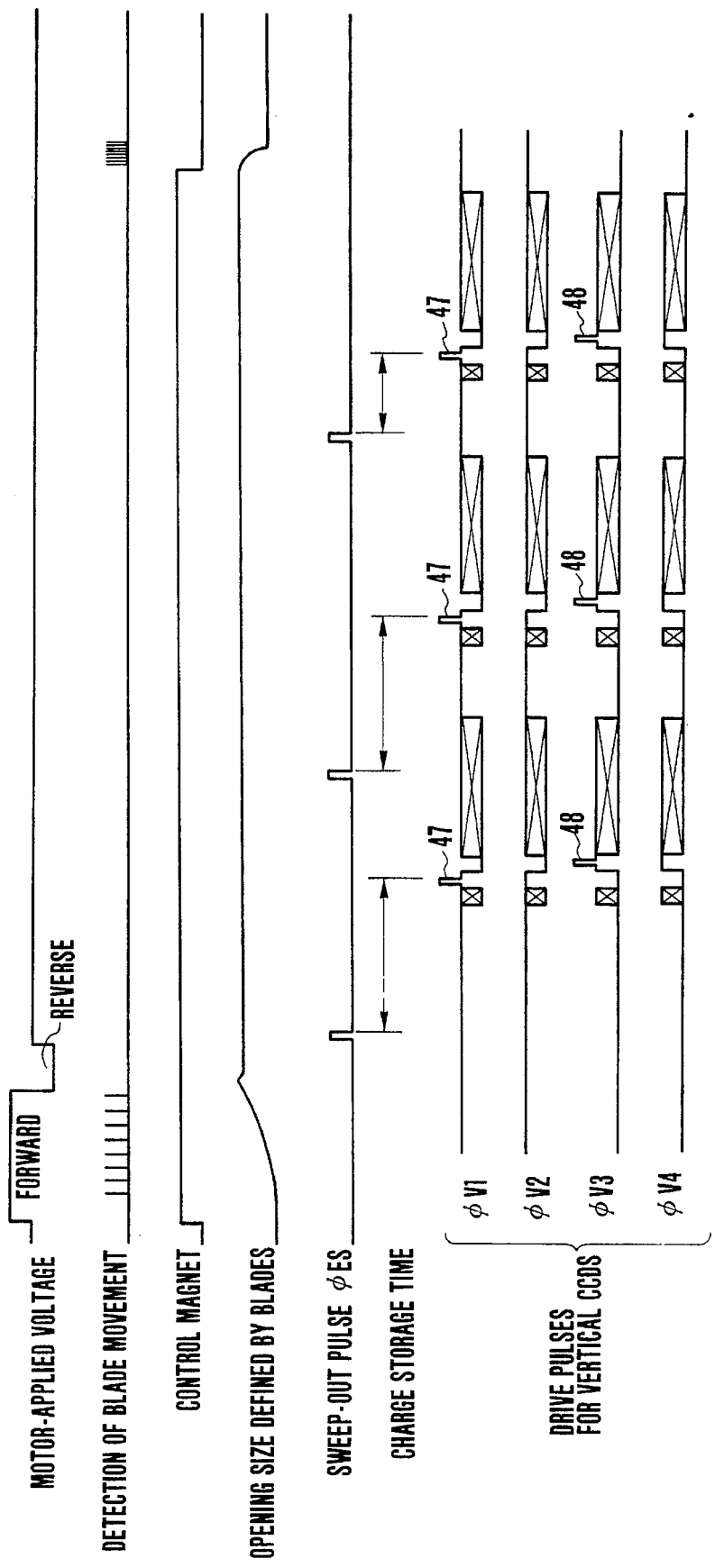
FIG. 15 is a timing chart showing the operation of the embodiment of FIGS. 13 and 14.

The image sensing apparatus according to the present invention is constructed as described above, and the operation will be described below with reference to FIGS. 7 to 15. FIGS. 7 to 10 are timing charts showing operations in various photography modes, FIGS. 11 and 12 are explanatory flowcharts of the operation of the first embodiment of the image sensing apparatus according to the present invention, FIGS. 13 and 14 are explanatory flowcharts of the second embodiment of the image sensing apparatus according to the present invention, and FIG. 15 is an explanatory timing chart of the operation of the second embodiment.

Figure 7:
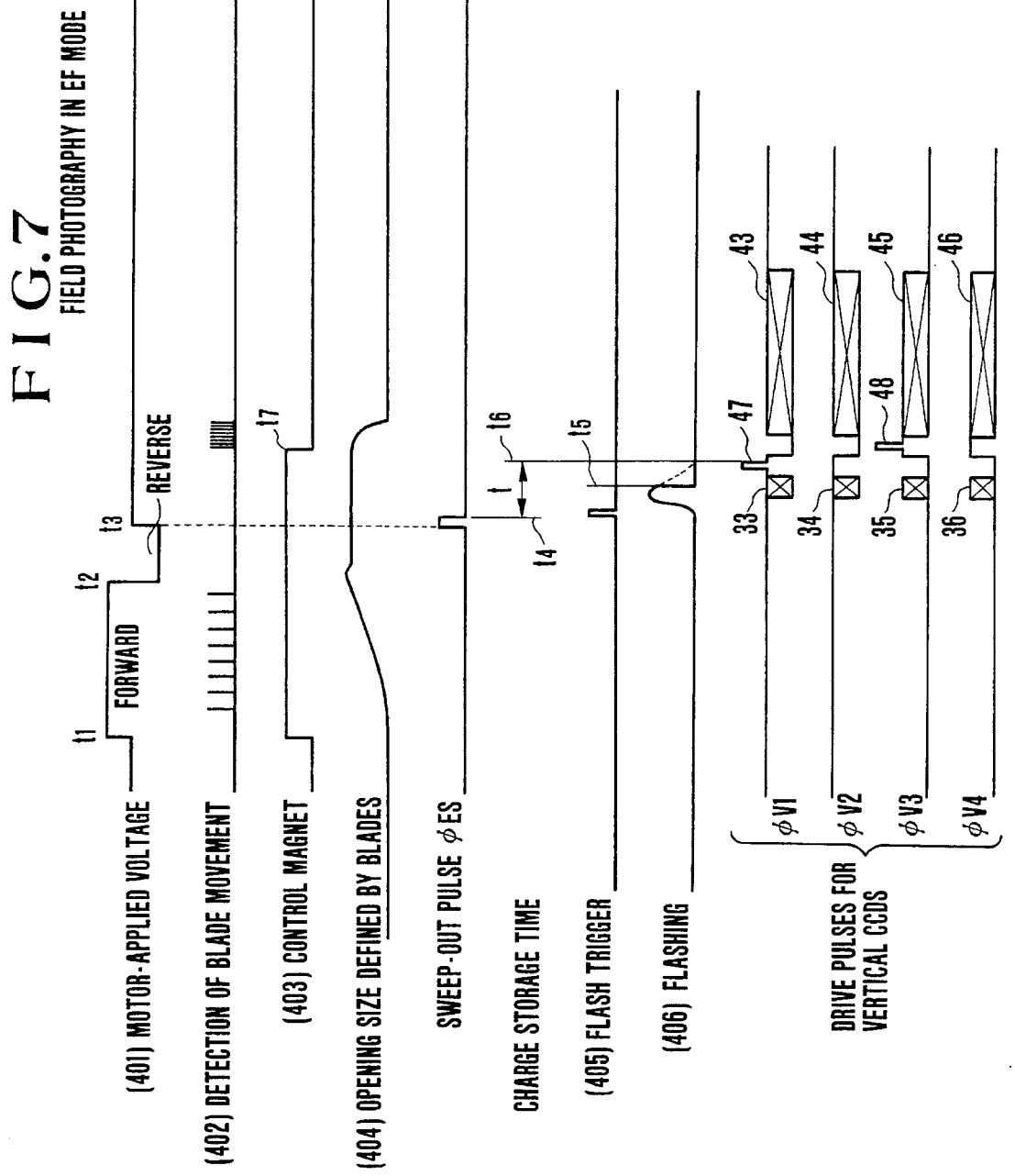
FIG. 7 is a timing chart showing the field photography operation of the embodiment of FIG. 6 when an EF mode is in operation.
Figure 8:
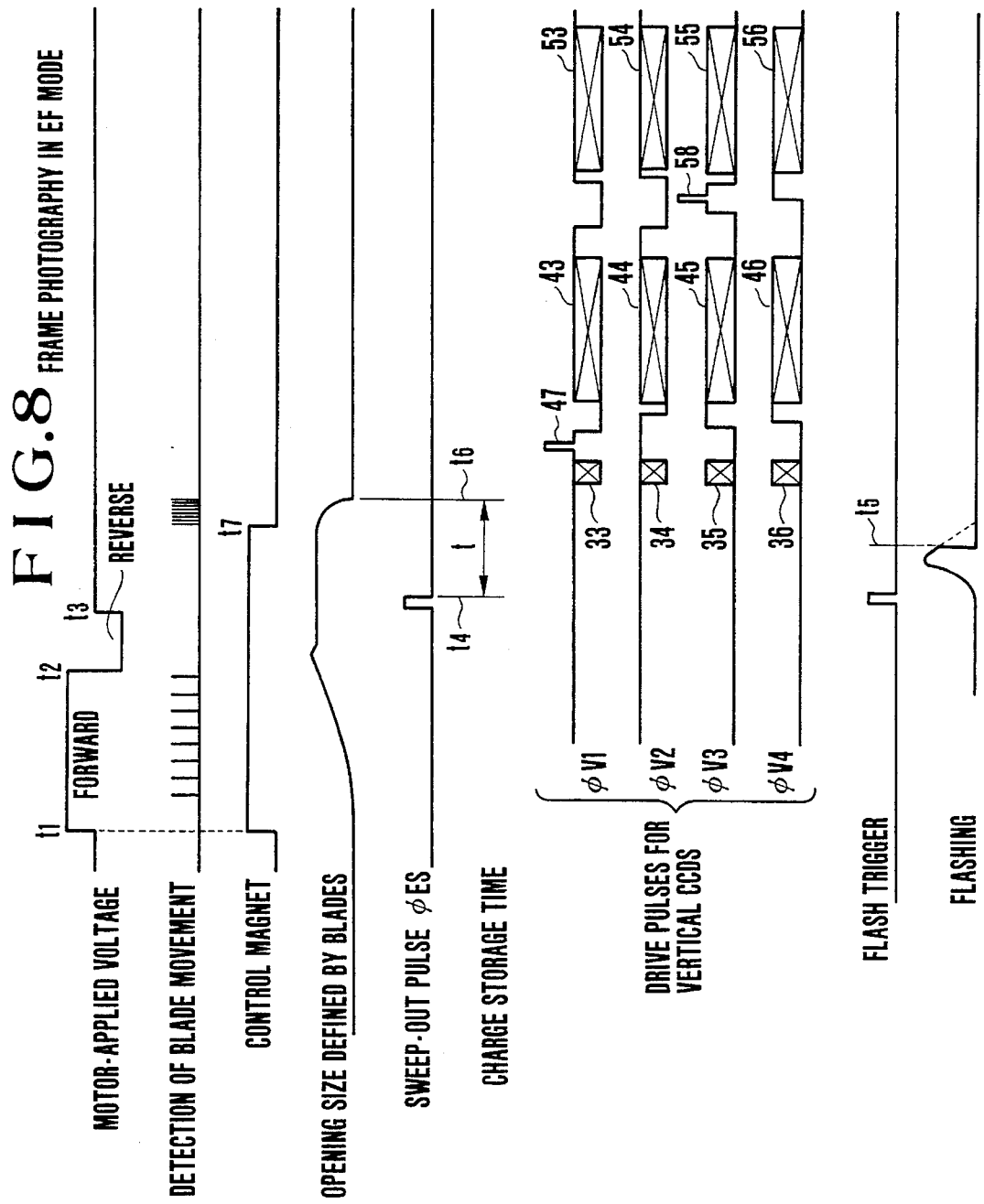
FIG. 8 is a timing chart showing the frame photography operation of the embodiment of FIG. 6 when the EF mode is in operation.
Figure 9:
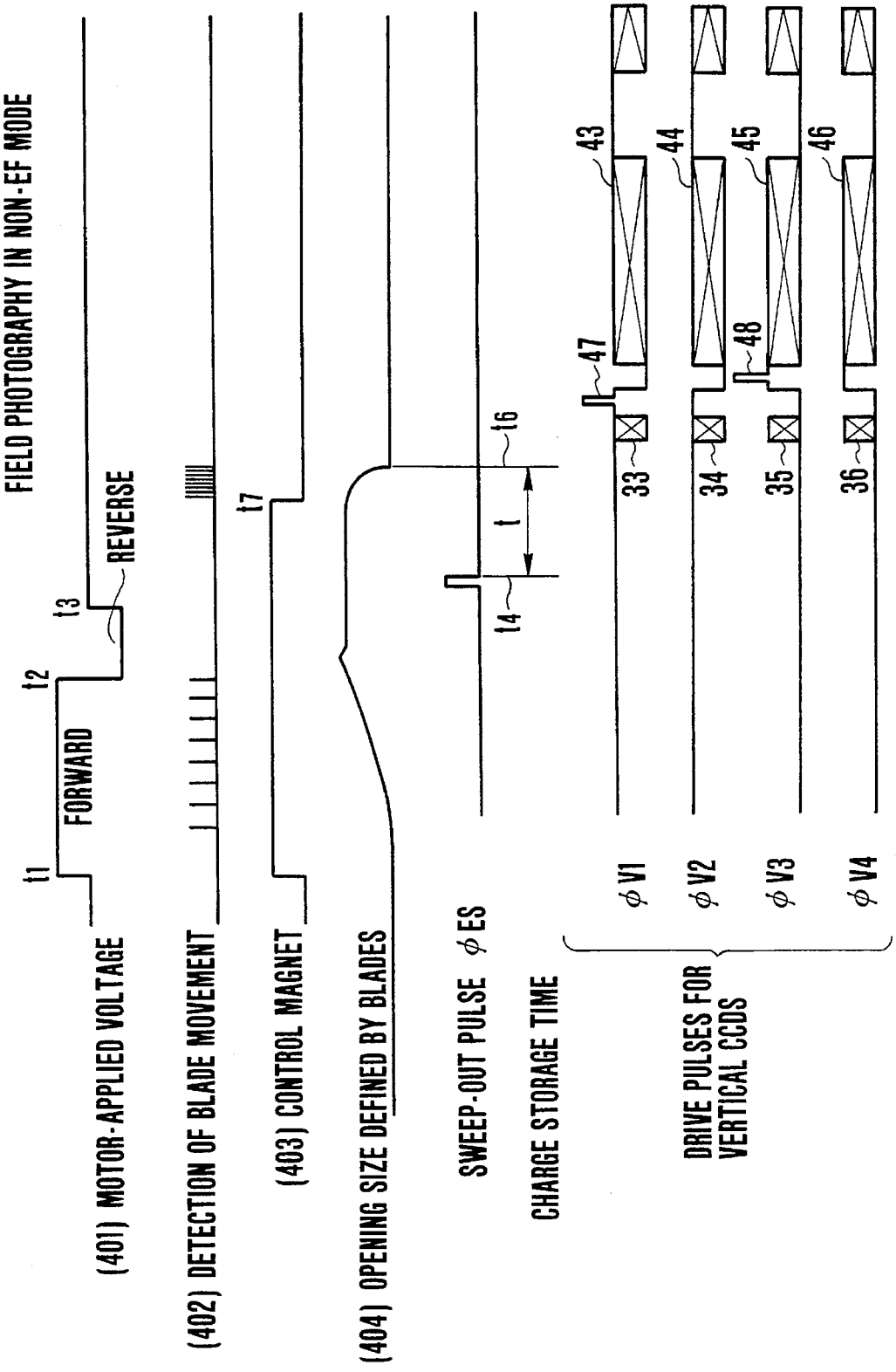
FIG. 9 is a timing chart showing the field photography operation of the embodiment of FIG. 6.
Figure 10:
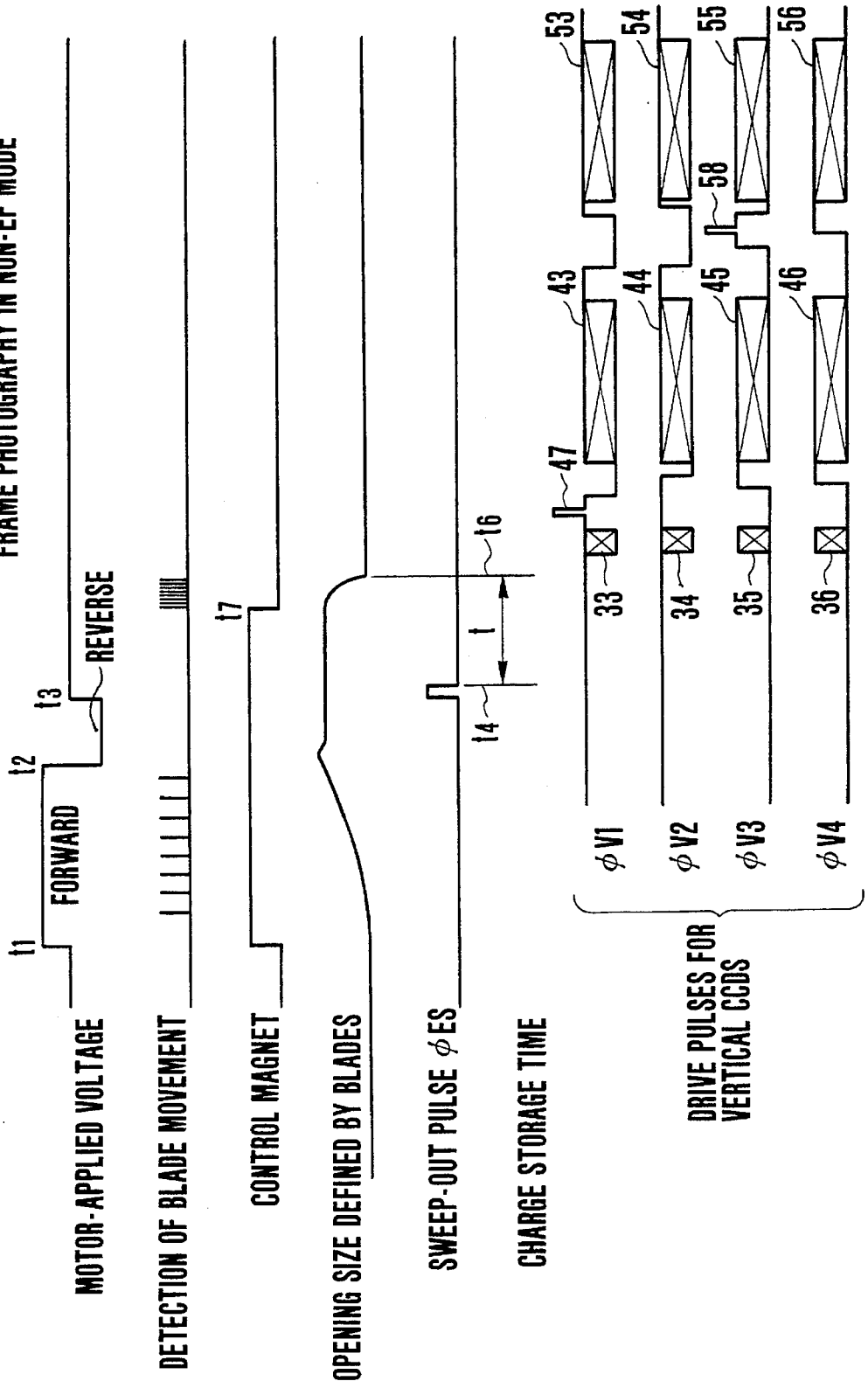
FIG. 10 is a timing chart showing the frame photography operation of the embodiment of FIG. 6.
Figure 11:
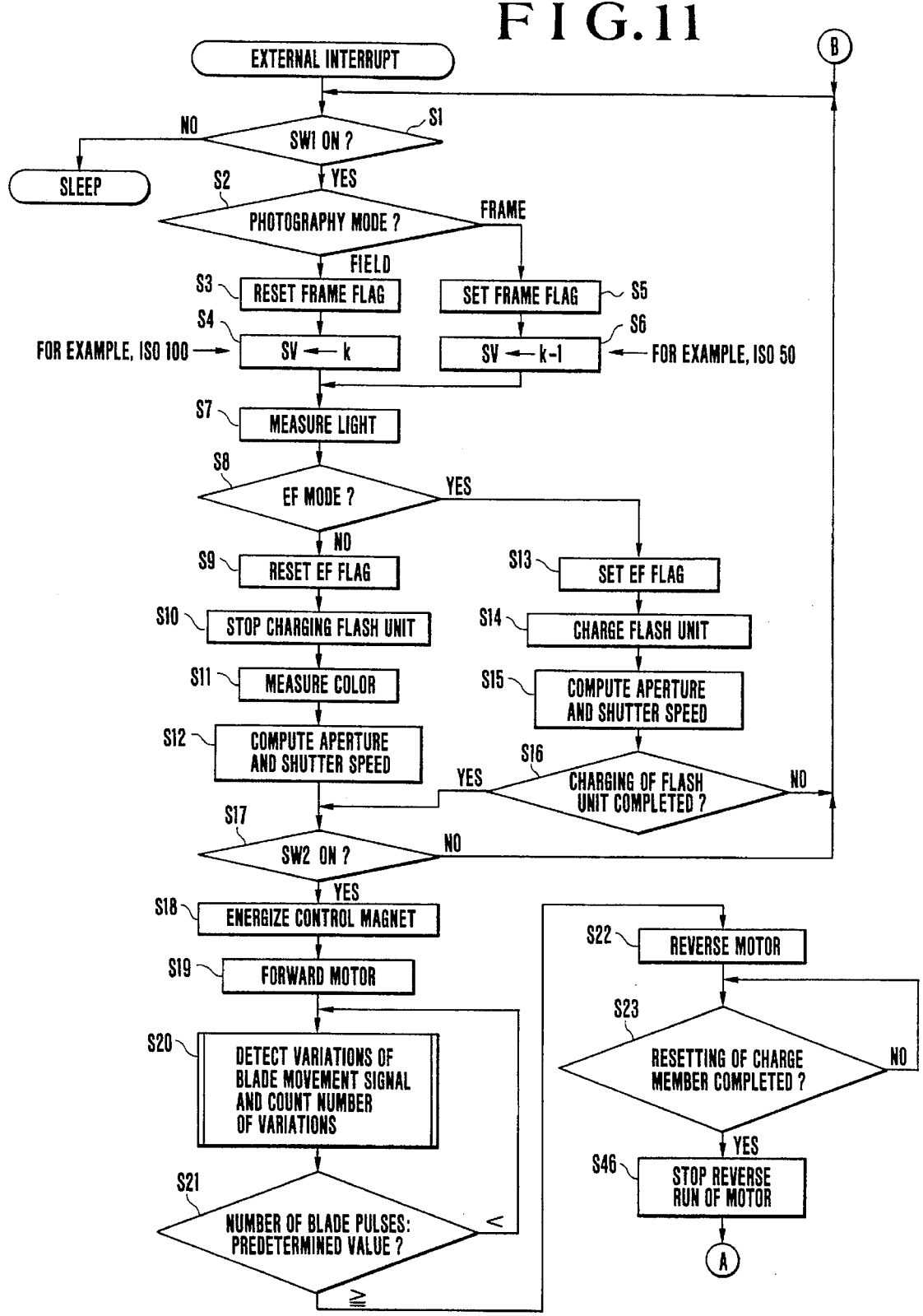
FIGS. 11 and 12 are explanatory flowcharts of the operation of the embodiment of FIG. 6.
Figure 12:
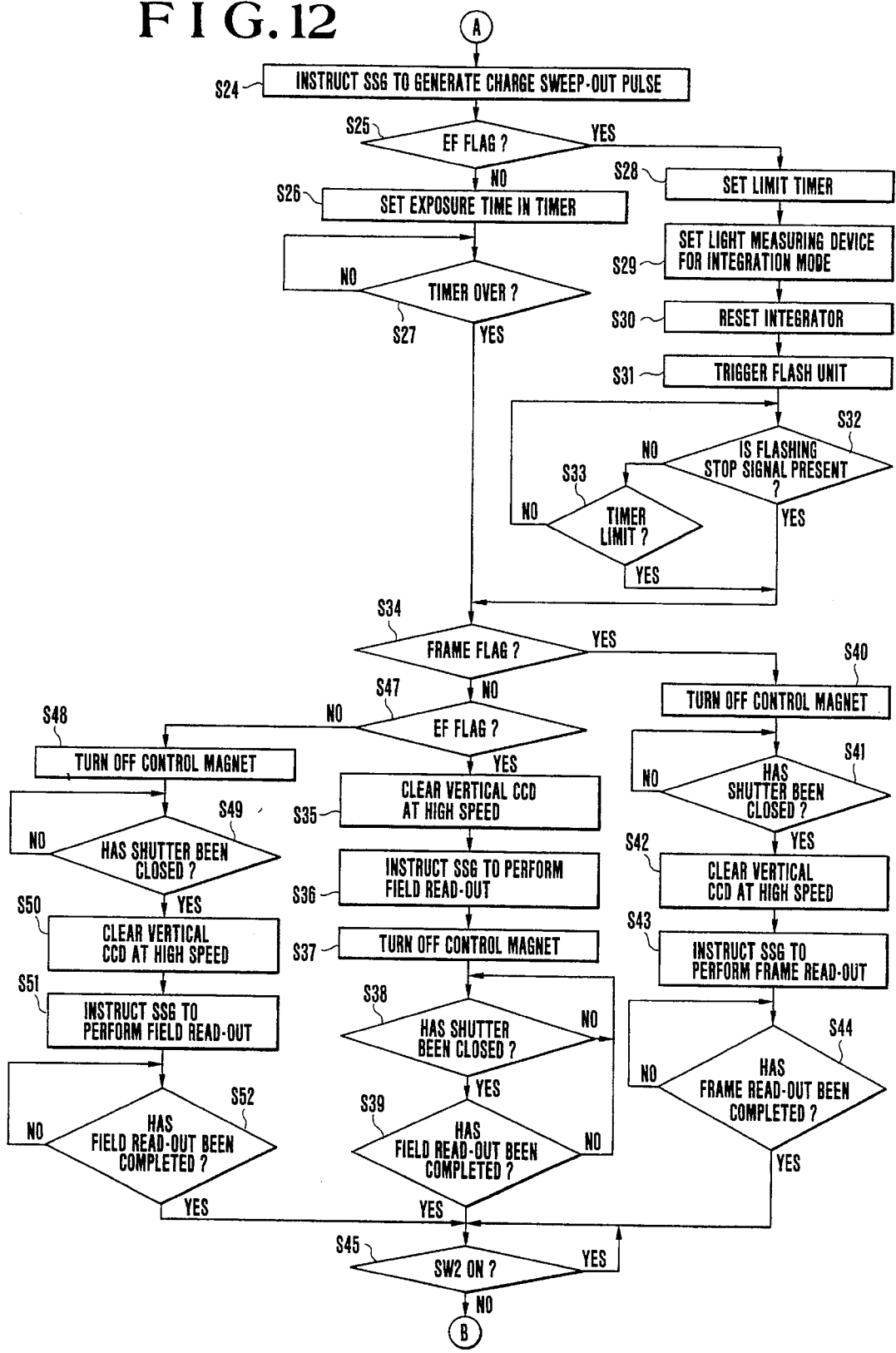

FIG. 7 is a timing chart showing the operation of the apparatus which is set for a field photography mode in an EF mode in which photography using an electronic flash unit is performed during the process shown in the flowcharts of FIGS. 11 and 12. FIG. 8 is a timing chart showing the operation of the apparatus which is set for a frame photography mode in the EF mode. FIG. 9 is a timing chart showing the operation of the apparatus which is set for the field photography mode in a non-EF mode. FIG. 10 is a timing chart showing the operation of the apparatus which is set for the frame photography mode in the non-EF mode.

Referring to the flowcharts of FIGS. 11 and 12, when a shutter release button (not shown) is depressed to a first stroke position, a switch SW1 is turned on to cause an external interrupt in the system controller 110, whereby a control sequence for photography is started. After it is checked (S1) whether the external interrupt is an error signal due to noise or the like, sensitivity for calculations on the amount of exposure, i.e., an SV value, is set according to a selected photography mode (S2 to S6). If the photography mode is not the frame photography mode, a frame flag indicative of the frame photography mode is reset in Step S3, and a predetermined value k (for example, ISO 100) is set as the sensitivity SV for the field photography mode in Step S4. In the case of the frame photography mode, a frame flag is reset in Step S5, and in Step S6, for example, k-1 which is one step (1 EV) lower than the sensitivity SV set in the field photography mode is set as the sensitivity SV for the frame photography mode (this "−1" means "low by one step", and if the sensitivity SV set in the field photography mode is ISO 100, ISO 50 is set). Then, the luminance information processing circuit 112 is set for a light measuring mode, in which the output of the light measuring device 111 is logarithmically compressed and digitized. The result is inputted into the system controller 110 (S7). Then, it is determined (S8) whether the photography mode is a photography mode using the electronic flash unit, i.e., the EF mode. In the case of the EF mode (refer also to FIG. 7 in the following description), the EF flag is set (S13), and flash charging (S14) and setting of an aperture and a shutter speed (S15) are carried out. Then, it is checked (S16) whether the flash charging has been completed. If the flash charging has not yet been completed, the process does not check (S17) whether a switch SW2 is on or off which is turned on when the shutter release button (not shown) is depressed to a second stroke position, and returns to Step S1 and repeat the above-described operations. If it is determined in Step S16 that the flash charging has been completed, the process proceeds to Step S17, where it is checked whether the switch SW2 is on or off. If the switch SW2 is not on, the process returns to Step S1. If it is determined in Step S8 that the EF mode has not been selected, the EF flag is reset (S9) and the flash charging is stopped (S10), and the color temperature of light illuminating a subject is measured (S11). An aperture value and a shutter speed are calculated from both the subject luminance measured in Step S7 and the sensitivity of the image sensor set in Step S4 or S6, and the state of the switch SW2 is checked (S17).

The above-described loop (S1 to S17) is executed, and when it is detected in Step S17 that the switch SW2 is on, as is apparent also from FIG. 7, the control magnet 304 and the reversible motor 302 for opening the shutter blades 310 and 311 are energized at time t1 (S18 and S19) so that the shutter blades 310 and 311 are set to an aperture value corresponding to the subject luminance measured in advance. As the motor 302 is driven forward (S19), the shutter blades 310 and 311 are made to open by means of the charge member 303 and the shutter-blade driving member 307 against urging forces which act on the shutter blades 310 and 311 in the closing directions thereof. With this operation, movement pulse generating means, made up of the pulse gear 308 and the photointerrupter 309 and interlocked with the shutter blades 310 and 311 or the shutter-blade driving member 307, outputs a signal 402 associated with the movement of the shutter blades 310 and 311, as shown in FIG. 7, and the signal 402 is supplied to the system controller 110. The system controller 110 counts the number of the signals 402 (S20), thereby detecting the opening size defined by the shutter blades 310 and 311. If the count coincides with the number of pulses corresponding to the aperture diameter calculated in advance (S21), the motor 302 is reversed at time t2 (S22).

As can be seen from FIGS. 17 and 18(a) to 18(c), the magnet lever 305 is pressed against the control magnet 304 by the projection 303d of the charge member 303 before the start of a shutter opening operation. At this time, since the control magnet 304 is being energized, the charge member 303 returns to the position shown in FIG. 18(c) with the reversal of the motor 302 (S22), but the magnet lever 305 is held in the position where it is attracted to the control magnet 304. When it is determined that the charge member 303 has returned to the position of FIG. 18(a) (S23), the reversal of the motor 302 is stopped at time t3 (S46). At this time, since the shutter blades 310 and 311 are being urged in their closing directions, they tend to close with the movement of the shutter-blade driving member 307. However, the shutter-blade driving member 307 is retained in position by the claw member 306, whereby a desired aperture diameter is held. After a correct aperture diameter has been set in the above-described manner, the electric charges in the image sensor 103 (the electric charges generated by heat and the photo-electrons produced by the optical subject image incident on the image sensor 103 during the time period from the start of an opening operation of the shutter blades 310 and 311 until the aperture value is set) are eliminated by the sweep-out pulse φES (S24). Then, exposure for photography is started at time t4.

The subsequent process branches into different paths in accordance with whether the EF mode using flashing has been selected.

First of all, the operation of the EF mode is described in conjunction with FIG. 7. A decision as to whether the EF mode has been selected is made on the basis of the EF flag (S25) in accordance with the decision performed in Step S8 before the start of the exposure operation. In this case, a storage-time limit timer for limiting charge storage time when the amount of exposure is insufficient in spite of full flashing is set (S28) and the luminance information processing circuit 112 is set for an integration mode (S29). After the signal integrated in an integrator up to that time has been reset (S30), a trigger signal 405 for flashing is transmitted to the flashing control circuit 114 (S31). The flashing control circuit 114 causes the electronic flash unit 113 to initiate flashing as shown at 406 in FIG. 7, in accordance with the trigger signal 405. Flash light reflected by a subject is photoelectrically converted by the light measuring device 111, and an electrical signal corresponding to the converted amount of incident light is integrated in the luminance information processing circuit 112. The luminance information processing circuit 112 compares the output of the light measuring device 111 integrated continuously from the time point of start of the flashing with a predetermined value which is selected to provide correct exposure. When the integral value is greater than the predetermined value (t5), the luminance information processing circuit 112 outputs a signal for stopping the flashing of the electronic flash unit 113 to the flashing control circuit 114 and to the system controller 110.

If such a flashing stop signal for the electronic flash unit 113 is generated, this means that a correct exposure has been completed. Accordingly, if the system controller 110 detects the flashing stop signal in Step S32, it performs processing for exposure completion and processing for reading out image information. Although processing executed for frame photography differs from that executed for field photography, the operation of the field photography mode will be described in connection with FIG. 7, as in the aforesaid description. It is determined (S34) whether the frame photography mode or the field photography mode has been selected, and if it is determined that the field photography mode has been selected and if it is determined (S47) that the EF mode has been selected, an exposure completion operation using the electronic shutter is performed. First, a clearing operation for elimination of unwanted electric charges which have leaked into the optically blocked vertical transfer paths of the image sensor 103 is performed by the pulses 33 to 36 shown in FIG. 7 (S35), and then, the system controller 110 instructs the SSG 108 to initiate a field read-out operation (S36). More specifically, after the completion of the operation of applying the high-speed transfer pulses 33 to 36 to sweep out the unwanted electric charges which have leaked into the vertical transfer shift registers (refer also to FIG. 3), a first read-out pulse 47 is applied to each of the first vertical transfer electrodes and a second read-out pulse 48 is then applied to each of the third vertical transfer electrodes. In consequence, the electric charges which have been moved to the vertical transfer shift registers (transferred to the third vertical transfer electrodes) by the first read-out pulses 47 are added to those which have been moved to the vertical transfer shift registers by the second read-out pulses 48, that is to say, so-called field read-out is performed in which the electric charges in each vertical pair of the photoelectric conversion elements 21 are added, then transferred vertically by the application of the vertical transfer pulses 43 to 46, and then read out line by line from the horizontal transfer shift register 23. Then, the energization of the control magnet 304 is stopped at time t7 (S37). It is to be noted that the operations of Steps S36 and S37 are in practice started approximately simultaneously. Since the magnet lever 305 is being urged counterclockwise by the spring 305c, when the energization of the control magnet 304 is stopped at the time t7, the magnet lever 305 turns counterclockwise to cause the claw member 306 to turn clockwise against the spring 306c. In consequence, the shutter-blade driving member 307 which has been disengaged drives the shutter blades 310 and 311 in their closing directions. The shutter-blade-movement detection signal 402 is generated with the movement of the shutter blades 310 and 311.

As described above, the operation of closing the shutter blades 310 and 311 and the field read-out operation for the image signals are performed in parallel, but in practice, the time instant of completion of exposure is controlled on the basis of the field read-out operation for the image signals. In other words, a charge storage time t of the image sensor 103 is determined by the time period required from the time t4 at which the charge sweep-out operation by the sweep-out pulse φES comes to an end until the application of the read-out pulse 47 which serves to move the electric charges from the photoelectric conversion elements to the vertical transfer shift registers. Whether the shutter-blade closing operation and the field read-out operation have been completed are checked in Steps S38 and S39, respectively, and if both operations have been completed, the state of the switch SW2 is checked (S45) so that an imaging operation is not performed twice or more by one shutter release operation. If the switch SW2 is turned off, the process returns to ⒷⒷ in FIG. 11 and returns to the processing starting with the check of the switch SW1.

FIG. 8 is a timing chart showing a frame photography operation in the EF mode using flashing. Only the portion of FIG. 8 which differs from FIG. 7 is explained below. As in the field read-out mode of FIG. 7, after the completion of the charge storage operation or full flashing has been detected on the basis of the sweep-out pulse φES, it is determined (S34) whether the frame photography mode or the field photography mode has been selected. In the case of the frame photography mode, the process proceeds to Step S40. Unlike the field photography mode, the energization of the control magnet 304 is stopped at time t7 to close the shutter 101 (S40). After it is confirmed (S41) that the shutter 101 has been closed (a wait for the passage of a predetermined time may be inserted instead of confirming the operation of the shutter 101), the unwanted electric charges in the vertical transfer paths are eliminated by being transferred at high speed by the application of the vertical high-speed transfer pulses 33 to 36 (S42). The system controller 110 instructs the SSG 108 to initiate a frame read-out operation (S43). More specifically, the first read-out pulses 47 are applied to the respective first vertical transfer electrodes φV1 to move the electric charges stored in the photoelectric conversion elements 21 along the odd lines onto the adjacent vertical transfer shift registers 22. Then, such electric charges are vertically transferred to the lowermost horizontal transfer shift register 23 by the application of the vertical transfer pulses 43 to 46, whereby the vertically transferred electric charges are read out sequentially line by line. In the above-described manner, the electric charges stored in the odd lines in the image sensing plane of the image sensor 103 are read out.

Subsequently, a second read-out pulse 58 is applied to each third vertical transfer electrode φV3 to move the electric charges stored in the photoelectric conversion elements 21 along the even lines onto the adjacent vertical transfer shift registers 22. Then, such electric charges are vertically transferred to the lowermost horizontal transfer shift register 23 by the application of vertical transfer pulses 53 to 56, whereby the vertically transferred electric charges are read out sequentially line by line. In the above-described manner, the electric charges stored in the even lines in the image sensing plane of the image sensor 103 are read out.

Through the above-described operation, the frame read-out operation is performed.

Operations executed after the completion of the frame read-out operation has been detected (S44) are substantially the same as those executed during the field photography, and description is omitted.

FIG. 10 is a timing chart showing the operation of generating exposure time for frame photography in the non-EF mode using no flashing. The frame photography in the non-EF mode using no flashing is different from the frame photography in the EF mode shown in FIG. 8 solely in that, referring to the flowcharts of FIGS. 11 and 12, after it is determined in Step S25 that the non-EF mode has been selected, the exposure time calculated in Step S12 is set in a timer (S26), the process waits for the completion of the counting operation of the timer to be detected (S27) and, thereafter, performs processing for exposure completion.

Regarding the field photography in the non-EF mode shown in FIG. 9, the operation of generating exposure time is similar to that executed in the frame photography of FIG. 10. The difference between the field photography in the non-EF mode of FIG. 9 and the frame photography of FIG. 10 resides in a process in which when it is determined in Step S47 that the non-EF mode has been selected, an exposure completion operation using the mechanical shutter is performed in a manner similar to that executed in the frame photography (S48 to S58).

The following is the reason why, in the field photography, the EF mode and the non-EF mode are made different in exposure completion processing; the former utilizes the electronic shutter and the latter, the mechanical shutter. In general, the operation of performing a read-out operation after covering the image sensor 103 with the shutter shown in FIGS. 17 to 19, as in the frame photography mode shown in FIG. 10, is effective in suppressing smears during read-out periods, compared to the use of the electronic shutter. In a situation using a flash unit, however, in many cases, a subject image is dark during the time period in which the flash unit is not flashing, and the subject image during the flashing of the flash unit is not easily smeared. Accordingly, the problem of smears substantially does not take place even during the above-described operation.

In the case of fill-in flash, since the luminance of a subject is comparatively high while the flash unit is not flashing, the problem of smear is not completely prevented. In this case (fill-in flash), however, regarding the time period required from the start of a transition from the storage state of a subject image (electric charge) to the non-storage state thereof until the completion of such a transition, since the time period required from the start of the light-blocking operation by optical light-blocking means until the completion thereof is longer than the time period required to transfer electric charges from photoelectric conversion pixels to optically blocked charge storage parts, the amount of charge storage due to background light upon completion of flashing reaches an unnegligible amount, and if the luminance of background light is high, overexposure will result. The excess amount of this overexposure is associated with the length of exposure time subsequent to the stop of flashing. Accordingly, if substantial exposure time is ended by transferring electric charges from the photoelectric conversion pixels to the optically blocked charge storage parts, an image of good quality can be advantageously obtained even if a smear is present. Incidentally, as a matter of course, the difference in substantial charge storage time between the two kinds of exposure completion processing due to the difference in operating time therebetween is compensated on the basis of operating mode flags (the EF flag and the frame flag) during the calculations on the exposure time and the shutter speed (S12).

Although the explanation of the above-described embodiment refers to the field photography, the frame photography and the EF photography, the following explanation is made in connection with another embodiment provided with a sequence which takes continuous shooting into account, in conjunction with FIGS. 13, 14 and 15. A system construction used is similar to that shown in FIG. 6.

In FIGS. 13 and 14, when the shutter release button is depressed to the first stroke position and the switch SW1 is turned on (S101), the luminance information processing circuit 112 is immediately set for the light measuring mode and the luminance of a subject is measured by using the light measuring device 111 (S102). The obtained measurement value (represented as "BV" in FIG. 13) is compared with a predetermined value ("$BV_f$" in FIG. 13). Only when the measurement value is above a certain luminance value, it is determined (S113) whether a continuous shooting mode has been selected, and a decision as to the kind of photography mode is made (S114). Further, to inhibit frame photography during the continuous shooting mode, this embodiment is arranged such that if the luminance of the subject is below $BV_f$, no frame photography is carried out. This arrangement is intended to prevent the following problems:

(1) In the frame photography, frame speed during continuous shooting becomes slow since long-time exposure is needed because of the lowness of sensitivity and because of the unavailability of exposure control using the electronic shutter.

(2) In the frame photography, because of the lowness of sensitivity, long-time exposure becomes needed under low-luminance conditions, and image shake easily occurs.

If BV is higher than $BV_f$ and a single shooting mode is set and, in addition, the frame photography mode is set, the frame flag is set (S115) and the sensitivity SV is set one step lower than in the field photography mode (S116). If any one of the aforesaid conditions is not satisfied (if BV is less than $BV_f$, the continuous shooting mode is selected or the field photography mode is set), the frame flag is reset (S104) and the sensitivity SV is set to a predetermined value (a value corresponding to the sensitivity of the image sensor 103) (S105).

Also, during the field photography mode (or during the continuous shooting or under low-luminance conditions), the aforesaid BV is compared with $BV_e$ (S106). This $BV_e$ is a decision level used to determine whether the EF mode (the mode using the electronic flash unit 113) is selected. The $BV_e$ is determined so that if subject luminance is lower than a certain value ($BV_e$), the EF mode is set automatically.

If BV is lower than $BV_e$, the EF flag is set (S107) and the electronic flash unit 113 is charged (S108). If BV is higher than $BV_e$ and during the frame photography mode, the EF flag is reset (S109), the charging of the electronic flash unit 113 is stopped (S110), and the color temperature of illumination light of the subject is measured (S111). When the charging of the electronic flash unit 113 is completed (S108) or the color measurement is completed (S111), the aperture value and shutter speed required for exposure are obtained on the basis of the operating mode flag, the value of the sensitivity SV and the value of BV measured in Step S102 (S112). The above-described processing starting with Step S101 is repeated until the on state of the switch SW2 is detected (S117).

When the on state of the switch SW2 is detected (S117), the control magnet 304 is energized (S118) and the motor 302 is driven forward (S119) to open the shutter blades 310 and 311. The subsequent processing of Steps S120 to S123 (setting of an aperture diameter) is similar to that explained in connection with the second embodiment (S20 to S23), and description is omitted. Thereafter, generation of exposure time is performed.

In the case of the non-EF mode, if it is determined that the non-EF mode has been selected (S124), the SSG 108 is made to generate the charge sweep-out pulse φES (S125) and the exposure time is set in the timer (S126). The process waits for the completion of the counting operation of the timer (S127).

In the case of the EF mode, it is checked whether the charging of the electronic flash unit 113 has been completed (S128). If the completion of the charging is detected, a limit timer provided for compensating for an insufficient amount of flashing is set (S129) and the luminance information processing circuit 112 is set for the integration mode (S130). The SSG 108 is instructed to generate the charge sweep-out pulse φES (S131) and the integrator of the luminance information processing circuit 112 is reset (S132), and a trigger signal for flashing is outputted (S133). When a flashing completion signal (S134) or the completion of the counting operation of the timer (S135) is detected, it is determined that the exposure has been completed.

After the exposure time has passed, it is checked whether the continuous shooting mode or the single shooting mode has been selected (S136). In the case of the single shooting mode, if the frame photography has been selected, exposure completion processing using the mechanical shutter 101, which starts at Step S138 where the control magnet 304 is turned off, is carried out (in a manner similar to that described in connection with the second embodiment). In the case of the field photography, exposure completion processing using the electronic shutter is carried out. The electric charges in the vertical transfer CCDs are eliminated (S143), the SSG 108 is instructed to perform a field read-out operation (S144) and the control magnet 304 is turned off (S145). When the completion of the shutter closing operation (S146) and the completion of the field read-out operation (S147) are detected, it is detected whether the switch SW2 is turned off (S148).

In the case of the continuous shooting mode, after the electric charges in the vertical transfer CCDs have been eliminated (S149), the operation of closing the mechanical shutter 101 is not carried out and the SSG 108 is instructed to perform a field read-out operation (S150). When the completion of this field read-out operation is detected (S151), it is checked whether the switch SW2 has been turned on (S152). If the switch SW2 is on, the process returns to the exposure operation without closing the mechanical shutter 101. When it is detected that the switch SW2 has been turned off, the control magnet 304 is turned off (S153) and the mechanical shutter 101 is closed.

With the above-described arrangement and operation, it is possible to achieve a high-speed continuous shooting operation which does not depend on the operating time of the mechanical shutter.

To increase sensitivity, the above-described embodiment is arranged so that forced switching from frame photography to field photography is performed depending on subject luminance. However, as a matter of course, the embodiment may also be arranged to carry out imaging corresponding to the frame photography or field photography selected in accordance with an instruction manually inputted by a user. In addition, the electronic flash unit may not be arranged to flash automatically.

The continuous shooting using the electronic shutter, explained in connection with the present embodiment, and continuous shooting in which the mechanical shutter 101 is driven each time one exposure is performed may be switched therebetween depending on the speed of continuous shooting.

It is apparent that, to adjust the amount of exposure in the continuous shooting using the electronic shutter explained in connection with the present embodiment, since the aperture diameter does not vary, the exposure time using the electronic shutter is varied like the third exposure cycle shown in FIG. 15. Although a light measuring step during continuous shooting is not shown in the flowchart of FIGS. 13 and 14, it is possible to easily adjust the amount of exposure during the aforesaid continuous shooting by performing the light measuring step immediately after it is detected in Step S152 that the switch SW2 is on or by performing the light measuring step during a wait for the completion of the field read-out operation in Step S151 (although the latter means is favorable in respect of time, light measurement immediately before the switch SW2 is turned off becomes useless).

As a matter of course, although frame speed during the continuous shooting becomes slow, if the mechanical shutter is driven each time one exposure is performed, the aperture diameter can also be controlled.

As described above, the image sensing apparatus according to the present invention is arranged such that, in the mode in which all pixel information in the image sensor is read out once, after control of the substantial charge storage time has been performed by using the so-called electronic shutter, light incident on the image sensor is optically blocked. Accordingly, it is possible to prevent uneven exposure due to variations in the operating time of an optical shutter and also to prevent smears from occurring when the charge storage time is controlled with the electronic shutter only.

Also, in the mode in which all pixel information in the image sensor is read out separately by a plurality of times, the substantial charge storage time is arranged such that substantial storage of photo-electrons is started by eliminating the electric charges in the pixels of the image sensor and is ended by blocking optically light incident on the image sensor. Accordingly, it is possible to prevent information read out from the pixels the second time or later from deteriorating (smears) due to light.

Both of the above-described modes have the advantage that it is possible to achieve an accurate aperture diameter and, even during a high-speed shutter operation, an accurate fully open exposure time.

In addition, since the accurate aperture diameter and, even in the high-speed shutter operation, the accurate fully open exposure time can be achieved, both modes have the advantage that it is possible to effect fill-in flash under various conditions according to a wide range of subject luminance.

What is claimed is:

1. An image sensing apparatus comprising:

A) a solid-state image sensor capable of sweeping out electric charges therefrom;

B) an optical shutter;

C) a release switch for instructing a photographing operation;

D) mode selecting means for selecting one of a plurality of photographing modes including a first mode and a second mode whose photographing characteristic is different from a photographing characteristic of said first mode; and E) a control circuit for controlling said optical shutter to cause said shutter to open in response to an operation of said release switch, and for controlling, in a first mode, a charge storage time of said solid-state image sensor according to a time period from a time point at which the electric charges of said solid-state image sensor are swept out when said optical shutter is in its open state to a time point at which said optical shutter is closed and for controlling, in said second mode, a charge storage time of said solid-state image sensor according to a time period from the time point at which the electric charges of said solid-state image sensor are swept out to a time point at which a read-out operation of said solid-state image sensor is executed.

2. An image sensing apparatus according to claim 1, wherein said control circuit causes in said first mode said solid-state image sensor to store electric charges for the time period from the time point at which the electric charges of said solid-state image sensor are swept out to the time point at which said optical shutter is closed, and performs read-out of the electric charges after said optical shutter has been closed.

3. An image sensing apparatus according to claim 1, wherein said control circuit sets, to a time period extending beyond a vertical blanking period, the time period from the time point at which the electric charges of said solid-state image sensor are swept out to the time point at which said optical shutter is closed.

4. An image sensing apparatus according to claim 1, wherein said control circuit causes in said first mode said solid-state image sensor to store electric charges for the time period from the time point at which the electric charges of said solid-state image sensor are swept out to the time point at which said optical shutter is closed, and drives, after said optical shutter has been closed, said solid-state image sensor at high speed to perform read-out of the electric charges.

5. An image sensing apparatus according to claim 1, wherein said control circuit varies timing to open and close said optical shutter.

6. An image sensing apparatus according to claim 1, wherein said control circuit varies timing to sweep out the electric charges from said solid-state image sensor.

7. An image sensing apparatus according to claim 1, wherein said control circuit varies timing to open and close said optical shutter and timing to sweep out the electric charges from said solid-state image sensor, with respect to timing to read out the electric charges.

8. An image sensing apparatus according to claim 1, wherein said solid-state image sensor is an interline CCD.

9. An image sensing apparatus according to claim 1, wherein said optical shutter serves also as a diaphragm.

10. An image sensing apparatus comprising:

A) image sensing means capable of clearing image information therefrom and permitting image information to be read out therefrom for the purpose of controlling charge storage time, said image sensing means being provided with a first read-out mode in which information is read out from effective pixels by a single read-out operation and a second read-out mode in which the information is read out from the effective pixels separately by a plurality of read-out operations;

B) an optical shutter;

C) selecting means for selecting the first or second read-out mode; and

D) control means, in response to said selecting means, for setting the charge storage time of said image sensing means by controlling an image-information clearing operation of the image sensing means and said read-out operation of said image sensing means in the first read-out mode, and said control means for setting the charge storage time of said image sensing means by controlling an image-information clearing operation of the image sensing means and a light-blocking operation of said optical shutter in the second read-out mode.

11. An image sensing apparatus according to claim 10, wherein when the first read-out mode is in operation, said control means controls the charge storage time through a charge sweep-out pulse and a charge read-out pulse for application to said image sensing means.

12. An image sensing apparatus according to claim 10, wherein said optical shutter serves also as a diaphragm and is capable of holding a predetermined open state, and completes exposure by a light-blocking operation.

13. An image sensing apparatus according to claim 10, wherein said control means starts storage of electric charges at sweep-out timing to sweep out electric charges from said image sensing means.

14. An image sensing apparatus according to claim 13, further comprising illumination means, said control means causing said illumination means to emit light at the sweep-out timing to sweep out the electric charges from said image sensing means.

15. An image sensing apparatus according to claim 10, wherein said optical shutter serves also as a diaphragm, and is capable of holding a predetermined open state and also of varying light-blocking timing.

16. An image sensing apparatus comprising:

A) image sensing means whose charge storage time is controllable;

B) optical light-blocking means;

C) illumination means; and

D) control means, responsive to a state of said illumination means, for performing control of substantial charge storage time without using said optical light-blocking means in the execution of photography utilizing said illumination means, and for performing control of substantial charge storage time with using said optical light-blocking means in the execution of photography without utilizing said illumination means.

17. An image sensing apparatus according to claim 16, wherein said control means controls the start of the charge storage time through a charge sweep-out pulse and a charge read-out pulse for application to said image sensing means.

18. An image sensing apparatus according to claim 16, wherein said optical light-blocking means serves also as a diaphragm and is capable of holding a predetermined open state, and completes exposure by a light-blocking operation.

19. An image sensing apparatus according to claim 17, wherein said control means starts storage of electric charges at sweep-out timing to sweep out electric charges from said image sensing means.

20. An image sensing apparatus according to claim 19, further comprising illumination means, said control means causing said illumination means to emit light at the sweep-out timing to sweep out the electric charges from said image sensing means.

* * * * *